United States Patent
Watanabe et al.

(10) Patent No.: US 9,575,501 B2
(45) Date of Patent: Feb. 21, 2017

(54) METHOD OF CONTROLLING FREQUENCY, FREQUENCY CONTROL SYSTEM, FREQUENCY CONTROL APPARATUS, AND PROGRAM

(71) Applicant: Panasonic Corporation, Osaka (JP)

(72) Inventors: Kenichi Watanabe, Osaka (JP); Wei Zhang, Osaka (JP); Hoday Stearns, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 547 days.

(21) Appl. No.: 14/131,277

(22) PCT Filed: May 15, 2013

(86) PCT No.: PCT/JP2013/003083
§ 371 (c)(1),
(2) Date: Jan. 7, 2014

(87) PCT Pub. No.: WO2013/172022
PCT Pub. Date: Nov. 21, 2013

(65) Prior Publication Data
US 2014/0222239 A1      Aug. 7, 2014

(30) Foreign Application Priority Data
May 15, 2012      (JP) .................................. 2012-111643

(51) Int. Cl.
*G05F 1/66* (2006.01)
*H02J 3/32* (2006.01)
*H02J 3/38* (2006.01)

(52) U.S. Cl.
CPC . *G05F 1/66* (2013.01); *H02J 3/32* (2013.01); *H02J 3/382* (2013.01); *Y02E 70/30* (2013.01)

(58) Field of Classification Search
CPC ........................................................ G05F 1/66
(Continued)

(56) References Cited

U.S. PATENT DOCUMENTS 8,097,981 B2    1/2012   Shimada et al.
2010/0090533 A1   4/2010   Shimada et al.
(Continued)

FOREIGN PATENT DOCUMENTS

JP    2003-284244    10/2003
JP    2005-20916      1/2005
(Continued)

OTHER PUBLICATIONS

International Search Report issued Jun. 11, 2013 in International Application No. PCT/JP2013/003083.

*Primary Examiner* — Joseph Chang
(74) *Attorney, Agent, or Firm* — Wenderoth, Lind & Ponack, L.L.P.

(57) ABSTRACT

A method of controlling frequency of a power system by a frequency control system includes: obtaining a frequency control command to keep frequency fluctuation of the power system within a predetermined range; obtaining information on electric power to be received or supplied by m second apparatuses, and determining n first command values for controlling electric power to be received or supplied by n first apparatuses, based on the frequency control command obtained in the obtaining of a frequency control command and the obtained information on electric power to be received or supplied by the m second apparatuses; and transmitting each of the n first command values determined in the determining to a corresponding one of the first apparatuses.

20 Claims, 14 Drawing Sheets

(58) Field of Classification Search
USPC .................................................... 307/84, 85
See application file for complete search history.

(56) References Cited

U.S. PATENT DOCUMENTS

| | | | |
|---|---|---|---|
| 2013/0263928 A1* | 10/2013 | Inoue | F22D 5/26 137/11 |
| 2014/0008988 A1* | 1/2014 | Clarke | H02J 3/40 307/84 |

FOREIGN PATENT DOCUMENTS

| | | |
|---|---|---|
| JP | 2007-124797 | 5/2007 |
| JP | 2007-166860 | 6/2007 |
| JP | 2008-141926 | 6/2008 |
| JP | 2008-193817 | 8/2008 |

\* cited by examiner

FIG. 13

| | Method of transmission performed by transmission control unit | Case 1 | Case 2 | Case 3 | Case 4 |
|---|---|---|---|---|---|
| First command value | Individual transmission | Electric power command value | Electric power command value | Frequency command value | Frequency command value |
| Second command value | Simultaneous transmission | Frequency command value | Electric power command value | Electric power command value | Frequency command value |

METHOD OF CONTROLLING FREQUENCY, FREQUENCY CONTROL SYSTEM, FREQUENCY CONTROL APPARATUS, AND PROGRAM

TECHNICAL FIELD

The present invention relates to frequency control methods, frequency control systems, frequency control apparatuses, and programs, and particularly to a method of controlling frequency in which command values are determined to control frequency of a power system in which dispersed power sources are interconnected.

BACKGROUND ART

In a power system, electric generators supply electricity to loads via a network of transmission lines and distribution lines. In the supplying of electricity, all the electric generators synchronously operate; frequency of the power system decreases when the load on the power system is above electricity supplied from the electric generators, and increases when the load on the power system is below the electricity. Each electric generator, by use of a governor, therefore increases output when the frequency decreases, and decreases output when the frequency increases (governor-free operation).

Furthermore, when fluctuation in the load cannot be absorbed fully by the governor-free operation, the electric generators perform load frequency control to adjust its output according to an output adjustment signal received from an electricity supply control center. However, because of their slow response, the electric generators have a problem of low following capability to output adjustment signals.

As an exemplary solution to the problem, Patent Literature (PTL) 1 discloses a technique for performing load frequency control by utilizing a dispersed power system, in which high responsiveness of secondary batteries is principally leveraged. With this, according to PTL 1, responsiveness of load frequency control is increased and thereby frequency stability is improved.

CITATION LIST

Patent Literature

[PTL 1]
Japanese Unexamined Patent Application Publication No. 2003-284244

SUMMARY OF INVENTION

Technical Problem

In recent years, there have been needs for load frequency control having even higher responsiveness.

Conceived to address the situations, the present invention has an object of providing a method of controlling frequency, a frequency control system, a frequency control apparatus, and a program, for load frequency control having even higher responsiveness.

Solution to Problem

A method of controlling frequency according to an embodiment of the present invention is a method of controlling frequency of a power system by a frequency control system which includes: plural apparatuses connected to the power system and including first apparatuses which are n in number and second apparatuses which are different from the first apparatuses and m in number, n and m each being a natural number not less than 1; and a frequency control apparatus which controls, via a communication network, electric power to be received and supplied by the plural apparatuses, and the method including: obtaining a frequency control command to keep frequency fluctuation of the power system within a predetermined range; (i) obtaining information on electric power to be received or supplied by the m second apparatuses, and (ii) determining n first command values for controlling electric power to be received or supplied by the n first apparatuses, based on the frequency control command obtained in the obtaining of a frequency control command and the obtained information on electric power to be received or supplied by the m second apparatuses; and transmitting each of the n first command values determined in the determining to a corresponding one of the first apparatuses.

Advantageous Effects of Invention

The method of controlling frequency, frequency control system, frequency control apparatus, and program according the present invention enables control for adjustment of electric power to be received and supplied by individual apparatuses to be controlled, by providing command values within a predetermined period of time, even when the apparatuses to be controlled are populous.

BRIEF DESCRIPTION OF DRAWINGS

FIG. 13 shows exemplary combinations of first command values and second command values.

Figure 1:
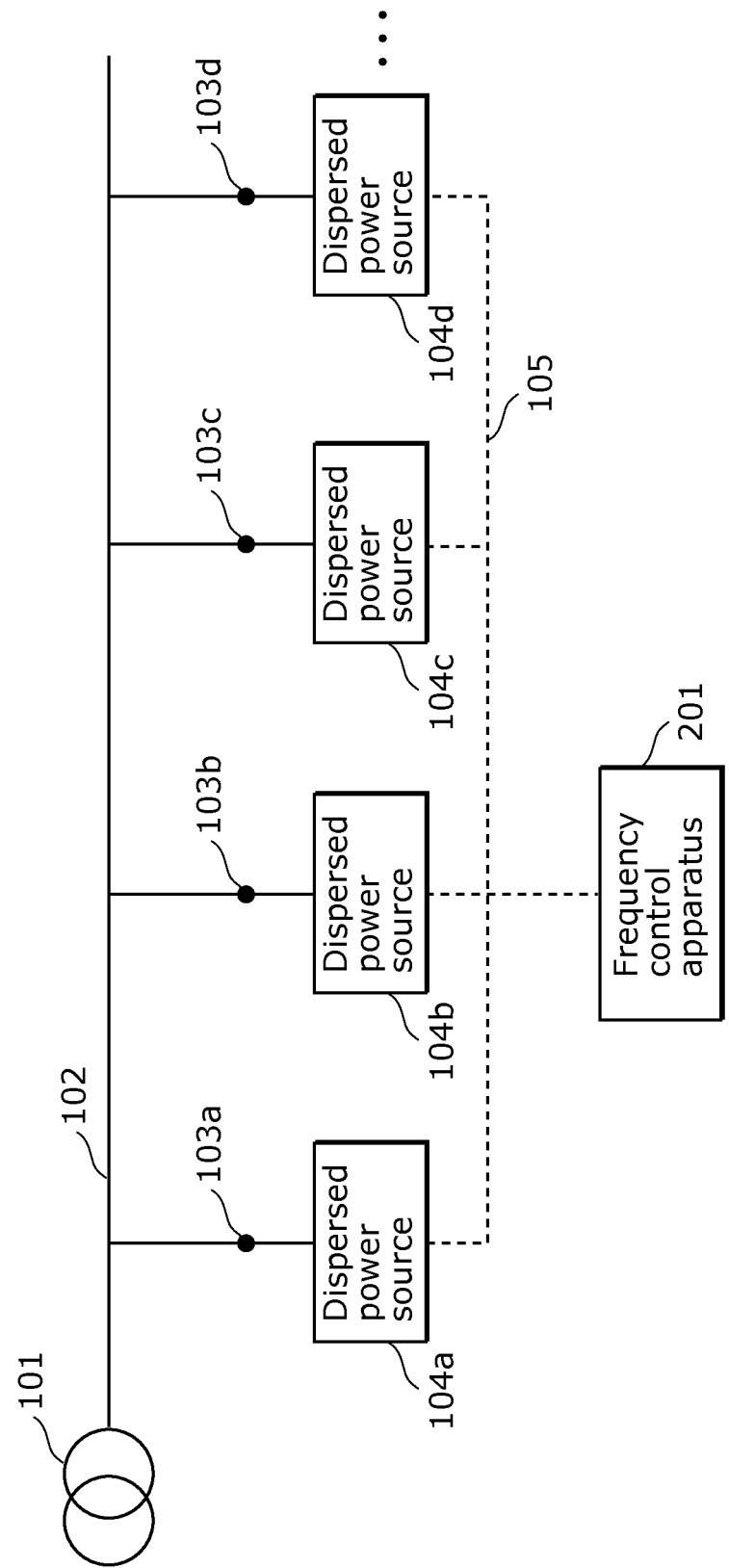
FIG. 1 is a conceptual diagram of a power system including a frequency control apparatus according to an embodiment.

DESCRIPTION OF EMBODIMENT (Underlying Knowledge Forming Basis of the Present Invention)

In the above-described conventional technique, required supply change command quantity is computed based on a frequency situation of a power system, and the computed required supply change command quantity is divided among the secondary batteries within the limits of capability values thereof, and notified to each of the secondary battery. However, PTL 1 does not have the disclosure of a method for notifying a plurality of secondary batteries of command quantities within a predetermined time. Thus, a new problem arises that when there are a large number of secondary batteries to be controlled, sending commands to all the secondary batteries takes such a long time that adjustment of reception and supply of electric power to and from all the secondary batteries cannot be finished within a predetermined time.

To solve the problem, a method of controlling a frequency according to an embodiment of the present invention is provided. The method is a method of controlling frequency of a power system by a frequency control system including: plural apparatuses connected to the power system and including first apparatuses which are n in number and second apparatuses which are different from the first apparatuses and m in number, n and m each being a natural number not less than 1; and a frequency control apparatus which controls, via a communication network, electric power to be received and supplied by the plural apparatuses, and the method includes: obtaining a frequency control command to keep frequency fluctuation of the power system within a predetermined range; (i) obtaining information on electric power to be received or supplied by the m second apparatuses, and (ii) determining n first command values for controlling electric power to be received or supplied by the n first apparatuses, based on the frequency control command obtained in the obtaining of a frequency control command and the obtained information on electric power to be received or supplied by the m second apparatuses; and transmitting each of the n first command values determined in the determining to a corresponding one of the first apparatuses.

This configuration enables control for adjustment of electric power to be received and supplied by individual apparatuses to be controlled, by transmitting command values thereto within a predetermined period of time, even when the apparatuses to be controlled are populous.

In one example, in the determining, one second command value for controlling electric power to be received or supplied by the m second apparatuses may be further determined based on the frequency control command obtained in the obtaining of a frequency control command, and in the transmitting, the second command value determined in the determining may be further transmitted to the m second apparatuses simultaneously.

In one example, the frequency control command may include a value of reception-supply electric power to be received from or supplied to the power system, each of the n first command values may include a value of electric power to be received or supplied by the corresponding one of the n first apparatuses, and in the determining, electric power equivalent to a difference between the reception-supply electric power included in the frequency control command and the electric power to be received or supplied by the m second apparatuses according to the second command value may be divided among the n first command values.

In another example, the frequency control command may include a value of reception-supply electric power to be received from or supplied to the power system, each of the n first command values may include an upper limit and a lower limit to the frequency fluctuation with respect to a predetermined reference frequency, the first command value being a value of a command which causes the corresponding one of the first apparatuses to receive electric power from the power system when the frequency of the power system is above the upper limit, and which causes the corresponding one of the first apparatuses to supply electric power to the power system when the frequency of the power system is below the lower limit, and in the determining, a difference between the upper limit and the lower limit included in each of the n first command values may be decreased as an absolute value of electric power equivalent to a difference between the reception-supply electric power included in the frequency control command and the electric power to be received or supplied by the m second apparatuses according to the second command value increases.

In one example, the second command value may include an upper limit and a lower limit to the frequency fluctuation with respect to a predetermined reference frequency, the second command value being a value of a command which causes the m second apparatuses to receive electric power from the power system when the frequency of the power system is above the upper limit, and which causes the m second apparatuses to supply electric power to the power system when the frequency of the power system is below the lower limit, and in the determining, a difference between the upper limit and the lower limit may be decreased as an absolute value of the reception-supply electric power included in the frequency control command increases.

In another example, the second command value may include a value of electric power to be received or supplied when the frequency of the power system deviates from a predetermined reference frequency, the second command value being a value of a command which causes the m second apparatuses to receive electric power from the power system when the frequency of the power system is above the reference frequency, and which causes the m second apparatuses to supply electric power to the power system when the frequency of the power system is below the reference frequency, and in the determining, the electric power may be increased in value as an absolute value of the reception-supply electric power to be received from or supplied to the power system included in the frequency control command increases.

In one example, the frequency control command may include a value of reception-supply electric power to be received from or supplied to the power system, and in the determining, the plural apparatuses may be classified as the n first apparatuses or the m second apparatuses so that a maximum electric power which the n first apparatuses as a whole are capable of receiving or supplying exceeds electric power equivalent to a difference between the reception-supply electric power included in the frequency control command and the electric power to be received or supplied by the m second apparatuses according to the second command value.

In another example, in the obtaining of a frequency control command, a plurality of the frequency control commands may be obtained at predetermined intervals, and in the determining, the second command value may be determined based on at least one of the frequency control commands which is obtained first in the obtaining of a frequency control command.

In one example, in the determining, among the plural apparatuses, n apparatuses each capable of transmitting the first command value within a predetermined time may be classified as the first apparatuses, and m apparatuses not classified as the first apparatuses may be classified as the second apparatuses.

In another example, the plural apparatuses may include plural secondary batteries, and among the plural secondary batteries, secondary batteries which are caused to perform only one of charging and discharging may be classified as the first apparatuses, and secondary batteries which are caused to perform only the other of charging and discharging may be classified as the second apparatuses.

In another example, among the plural apparatuses, apparatuses which are capable of performing only one of consumption of electric power and supply of electric power may be classified as the first apparatuses, and apparatuses which are capable of performing both of consumption of electric power and supply of electric power may be classified as the second apparatuses.

For example, in the obtaining of a frequency control command, a plurality of the frequency control commands may be obtained at predetermined intervals, and in the determining, each time the frequency control command may be obtained in the obtaining of a frequency control command, the n first command values are determined for the respective n first apparatuses according to the frequency control command.

For example, in the obtaining of a frequency control command, the frequency control command may be generated and obtained.

A frequency control system according to an embodiment of the present invention includes: plural apparatuses connected to a power system and including first apparatuses which are n in number and m second apparatuses which are different from the first apparatuses and m in number, n and m each being a natural number not less than 1; and a frequency control apparatus which controls, via a communication network, electric power to be received and supplied by the plural apparatuses, wherein the frequency control apparatus includes: a command obtainment unit configured to obtain a frequency control command to keep frequency fluctuation of the power system within a predetermined range; a determination unit configured to (i) obtain information on electric power to be received or supplied by the m second apparatuses, and (ii) determine n first command values for controlling electric power to be received or supplied by the n first apparatuses, based on the frequency control command obtained by the command obtainment unit and the obtained information on electric power to be received or supplied by the m second apparatuses; and a transmission control unit configured to transmit each of the n first command values determined by the determination unit to a corresponding one of the first apparatuses, and each of the first apparatuses receives from or supplies to the power system electric power according to the corresponding one of the first command values received from the frequency control apparatus.

Furthermore, the present invention may be implemented as a dispersed power source for use in the frequency control system.

A dispersed power source according to an embodiment of the present invention is a dispersed power source in a frequency control system which controls frequency of a power system, and the dispersed power source includes plural apparatuses which are controlled by a server and include first apparatuses which are n in number and second apparatuses which are different from the first apparatuses and m in number, n and m each being a natural number not less than 1, wherein the dispersed power source receives, from the server, electric power command values determined by the server as n first command values for controlling electric power to be received or supplied by the respective first apparatuses which are n in number, based on electric power to be received or supplied by the m second apparatuses and a frequency control command to keep frequency fluctuation of the power system within a predetermined range, and receives from or supplies to the power system, electric power corresponding to the electric power command values received from the server.

A frequency control apparatus according to an embodiment of the present invention is a frequency control apparatus included in a frequency control system which controls frequency of a power system and in which the frequency control apparatus controls, via a communication network, electric power to be received and supplied by plural apparatuses including first apparatuses which are n in number and second apparatuses which are different from the first apparatuses and m in number, n and m each being a natural number not less than 1, and the frequency control apparatus includes: a command obtainment unit configured to obtain a frequency control command to keep frequency fluctuation of the power system within a predetermined range; a determination unit configured to (i) obtain information on electric power to be received or supplied by the m second apparatuses, and (ii) determine n first command values for controlling electric power to be received or supplied by the n first apparatuses, based on the frequency control command obtained by the command obtainment unit and the obtained information on electric power to be received or supplied by the m second apparatuses; and a transmission control unit configured to transmit each of the n first command values determined by the determination unit to a corresponding one of the first apparatuses.

A program according to an embodiment of the present invention is a program for causing a computer to cause plural apparatuses to receive and supply electric power, the plural apparatuses being connected to a power system and including first apparatuses which are n in number and second apparatuses which are different from the first apparatuses and m in number, n and m each being a natural number not less than 1, and the program causes the computer to execute: obtaining a frequency control command to keep frequency fluctuation of the power system within a predetermined range; (i) obtaining information on electric power to be received or supplied by the m second apparatuses, and (ii) determining n first command values for controlling electric power to be received or supplied by the n first apparatuses, based on the frequency control command obtained in the obtaining of a frequency control command and the obtained information on electric power to be received or supplied by the m second apparatuses; and a transmission control unit configured to transmit each of the n first command values determined by the determination unit to a corresponding one of the first apparatuses.

An embodiment of the present invention is described below with reference to the drawings.

The embodiment described below shows a preferred specific example of the present invention. The values, materials, constituent elements, layout and connection of the constituent elements, steps, and the order of the steps in the embodiment are given not for limiting the present invention but merely for illustrative purposes only. The scope of the present invention is limited only by the claims. Thus, among the constituent elements in the following embodiment, a constituent element not included in the independent claim providing the most generic description of the present invention is not always necessary for the present invention to solve the problem but shall be described as a constituent element of a preferable embodiment.

[Embodiment]

FIG. 1 is a conceptual diagram of a power system including a frequency control apparatus 201 according to the present embodiment.

As shown in FIG. 1, the power system includes a substation 101, a power line 102, frequency detecting points 103*a*, 103*b*, 103*c*, and 103*d*, dispersed power sources 104*a*, 104*b*, 104*c*, and 104*d*, a communication line 105, and a frequency control apparatus 201. FIG. 1 does not show a load for the sake of simplicity of description.

The power line 102 connects the substation 101 with the dispersed power sources 104*a*, 104*b*, 104*c*, and 104*d*. The power line 102 transmits electricity supplied from the substation 101 to the dispersed power sources 104*a*, 104*b*, 104*c*, and 104*d* and the load not shown in FIG. 1, and electricity supplied from the dispersed power sources 104*a*, 104*b*, 104*c*, and 104*d* to the load not shown in FIG. 1. The term "load" means any apparatus which operates with electric power, such as a refrigerator, a washing machine, and a television set.

The frequency detecting points 103*a*, 103*b*, 103*c*, and 103*d* are points at which the dispersed power sources 104*a*, 104*b*, 104*c*, and 104*d* detect the frequency of the power system, respectively. The frequency detecting points 103*a*, 103*b*, 103*c*, and 103*d* may be hereinafter collectively referred to as frequency detecting points 103. The dispersed power sources 104*a*, 104*b*, 104*c*, and 104*d* may be hereinafter collectively referred to as dispersed power sources 104.

Each of the dispersed power sources 104 is, for example, a dispersed electricity generation system such as a photovoltaic system or a fuel cell system, or a dispersed electric energy storage system such as a secondary battery system. The dispersed power sources 104 each includes, for example, an electricity generation apparatus or an electricity storage apparatus, and a power conditioner which converts a direct-current (DC) power generated by the electricity generation apparatus or provided from the electricity storage apparatus into an alternate current (DC-AC conversion). Examples of the electricity generation apparatus include a photovoltaic cell and a fuel cell. Examples of the electricity storage apparatus include a secondary battery. In the present embodiment, the dispersed power sources 104 are not limited to but described as a system including a secondary battery.

The dispersed power sources 104 supply electric power to a power system and receive electric power from the power system in order to maintain frequency of the power system within a predetermined range. In the example described below, a reference frequency of the power system is 50 Hz and the predetermined tolerance level is ±0.1 Hz. The secondary batteries, which are an example of apparatuses connected to the power system is charged with electric power (or receives electric power) from the power system and discharges electric power (or supplies electric power) to the power system.

The communication line 105 enables communications of data or information between the frequency control apparatus 201 and the dispersed power sources 104. Examples of the communication line 105 include the Internet, power line communication (PLC), and 950 MHz-band radio. The frequency control apparatus 201 may communicate data or information also with the substation 101 via the communication line 105, unless the substation 101 doubles the frequency control apparatus 201 in terms of function.

The frequency control apparatus 201 controls electric power to be received and supplied by the dispersed power sources 104 to adjust frequency of the power system. The following describes the frequency control apparatus 201 in detail with reference to FIG. 2 and FIG. 3.

Figure 2:
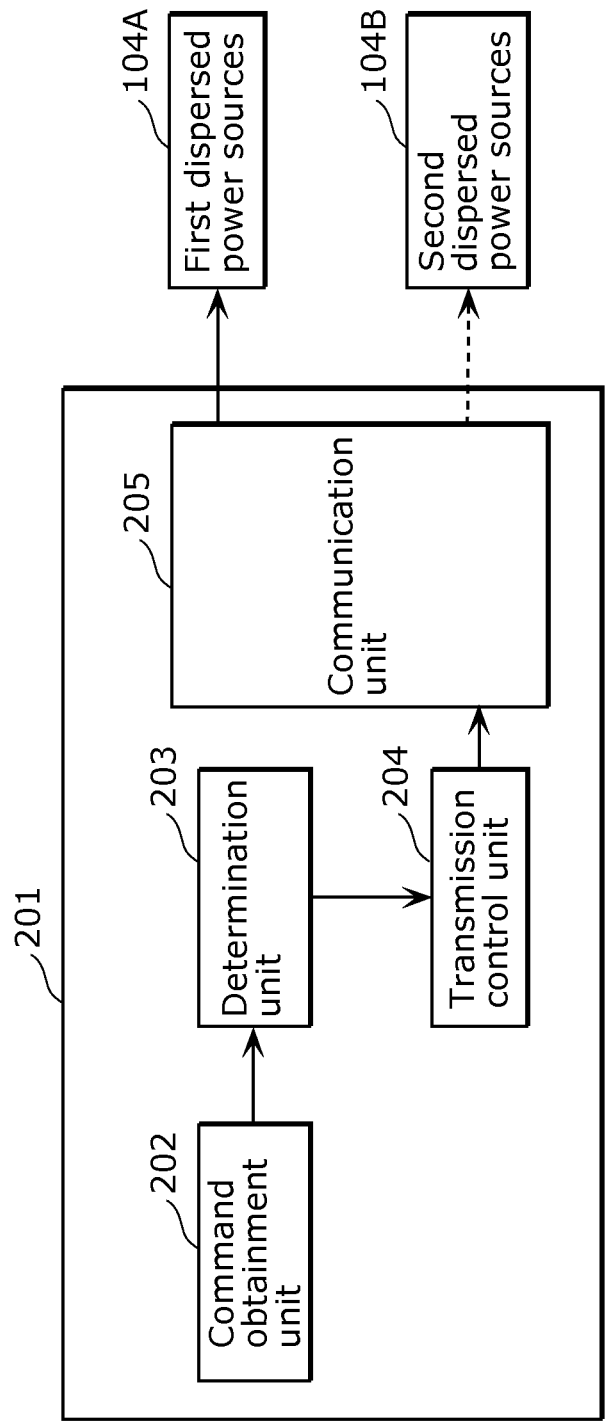
FIG. 2 shows an exemplary functional block diagram of the frequency control apparatus according to the embodiment.

FIG. 2 is a functional block diagram of the frequency control apparatus 201 according to the present embodiment. As shown in FIG. 2, the frequency control apparatus 201 includes a command obtainment unit 202, a determination unit 203, a transmission control unit 204, and a communication unit 205.

The command obtainment unit 202 receives a frequency control command from an electricity supply control center or a system control apparatus and forwards the frequency control command to the determination unit 203. The command obtainment unit 202 may obtain a frequency control command by monitoring frequency of the power system on a regular basis and generating a frequency control command by itself instead of receiving a frequency control command from an electricity supply control center or a system control apparatus. For example, the command obtainment unit 202 obtains and generates a frequency control command by monitoring frequency of the power system and performing the same calculation as performed by the electricity supply control center or the system control apparatus. The role of the electricity supply control center or the system control apparatus may be performed by the substation 101 or a facility (not shown) upstream or downstream of the substation 101 in the power system, for example.

The frequency control command is issued by the electricity supply control center or the system control apparatus to keep frequency fluctuation of the power system within a predetermined range. The frequency control command includes a reception-supply electric power which includes a value of electric power to be received from or supplied to the power system.

More specifically, for example, a reception-supply electric power having a value of +5 kW indicates that an electric power of 5 kW is to be additionally supplied to a power system where an electric power of 100 kW is currently supplied (or that electricity power currently being consumed is to be reduced by 5 kW). This is referred to as "to supply electric power to a power system". A reception-supply electric power having a value of −5 kW indicates that an electric power of 100 kW currently being supplied to a power system is reduced by 5 kW (or that electricity power currently being consumed is to be increased by 5 kW). This is referred to as "to receive electric power from a power system".

The determination unit 203 classifies the dispersed power sources 104a, 104b, 104c, and 104d as first dispersed power sources (first apparatuses) 104A or second dispersed power sources (second apparatuses) 104B. The dispersed power sources 104 which are n in number (n is a natural number not less than 1) classified as the first dispersed power sources 104A supply and receive electric power to and from the power system under individual control by the frequency control apparatus 201. On the other hand, the dispersed power sources 104 which are m in number (m is a natural number not less than 1) classified as the second dispersed power sources 104B supply and receive electric power to and from the power system under common control by the frequency control apparatus 201.

The determination unit 203 determines n first command values for the n respective dispersed power sources 104 classified as the first dispersed power sources 104A, according to a frequency control command obtained by the command obtainment unit 202. Furthermore, the determination unit 203 determines a common (single) second command value for the m dispersed power sources 104 classified as the second dispersed power sources 104B. In other words, the number of first command values is n at a maximum, and the number of second command values is one.

The transmission control unit 204 transmits, via the communication unit 205, each of the n first command values determined by the determination unit 203 to a corresponding one of the first dispersed power sources 104A (unicast), and the second command value determined by the determination unit 203 to the m dispersed power sources 104B simultaneously (broadcast or multicast).

The communication unit 205 is a communication interface with the dispersed power sources 104 and transmits the first command values and the second command value to the dispersed power sources 104 via the communication line 105.

Figure 3:
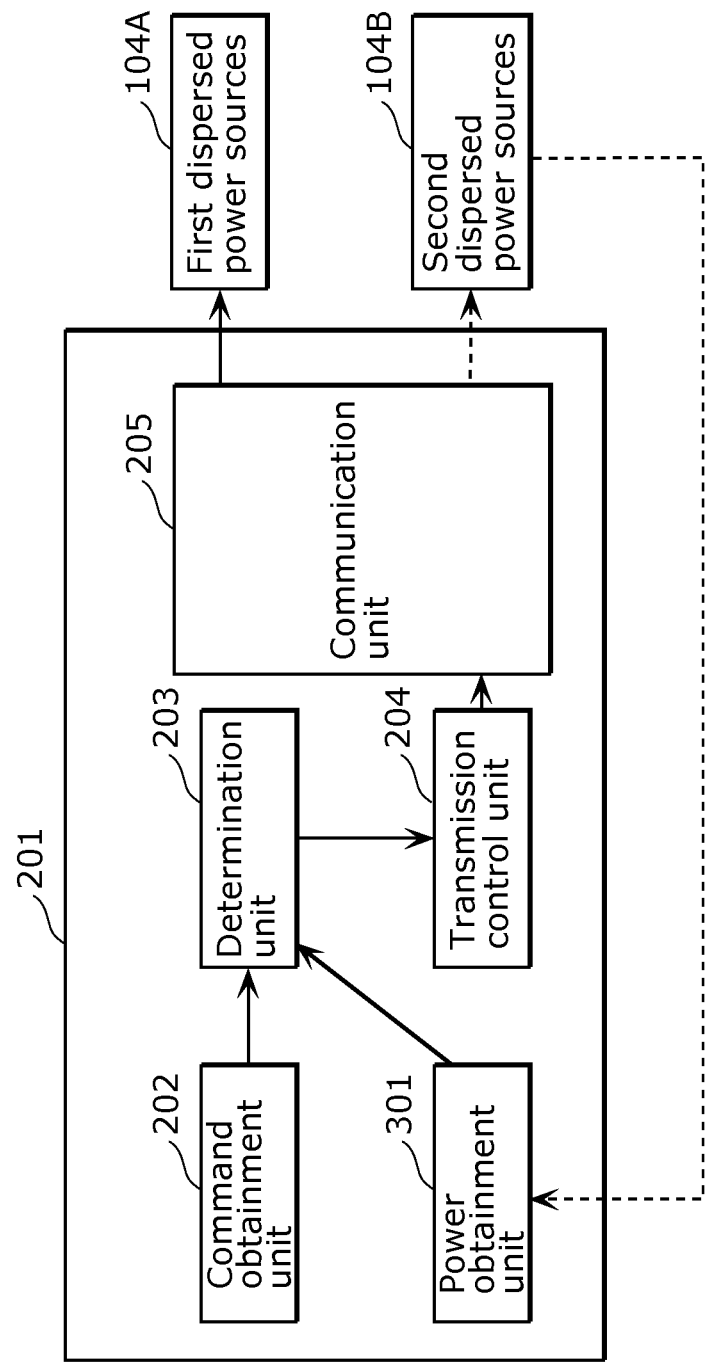
FIG. 3 shows another exemplary functional block diagram of the frequency control apparatus according to the embodiment.

FIG. 3 shows another exemplary functional block diagram of the frequency control apparatus 201 according to the present embodiment. The constituent elements in common with FIG. 2 are denoted with the same reference signs, and description thereof is omitted. As shown in FIG. 3, the frequency control apparatus 201 may further include a power obtainment unit 301 in addition to the configuration shown in FIG. 2.

The power obtainment unit 301 obtains the value of electric power to be supplied or received by the power system to and from the second dispersed power sources 104B according to the second command value and forwards the value to the determination unit 203 via the communication line 105. In this operation, the determination unit 203 determines first command values such that (a first command value)≈(the value of a frequency control command)−(the value of electric power to be supplied or received by the second dispersed power source according to the second command value). In other words, the determination unit 203 determines first command values such that the sum of the value of electric power to be supplied or received by the first dispersed power sources according to the first command values and the value of electric power to be supplied or received by the second dispersed power sources according to the second command value approximates the value of a frequency control command. This is described in detail later.

Figure 4:
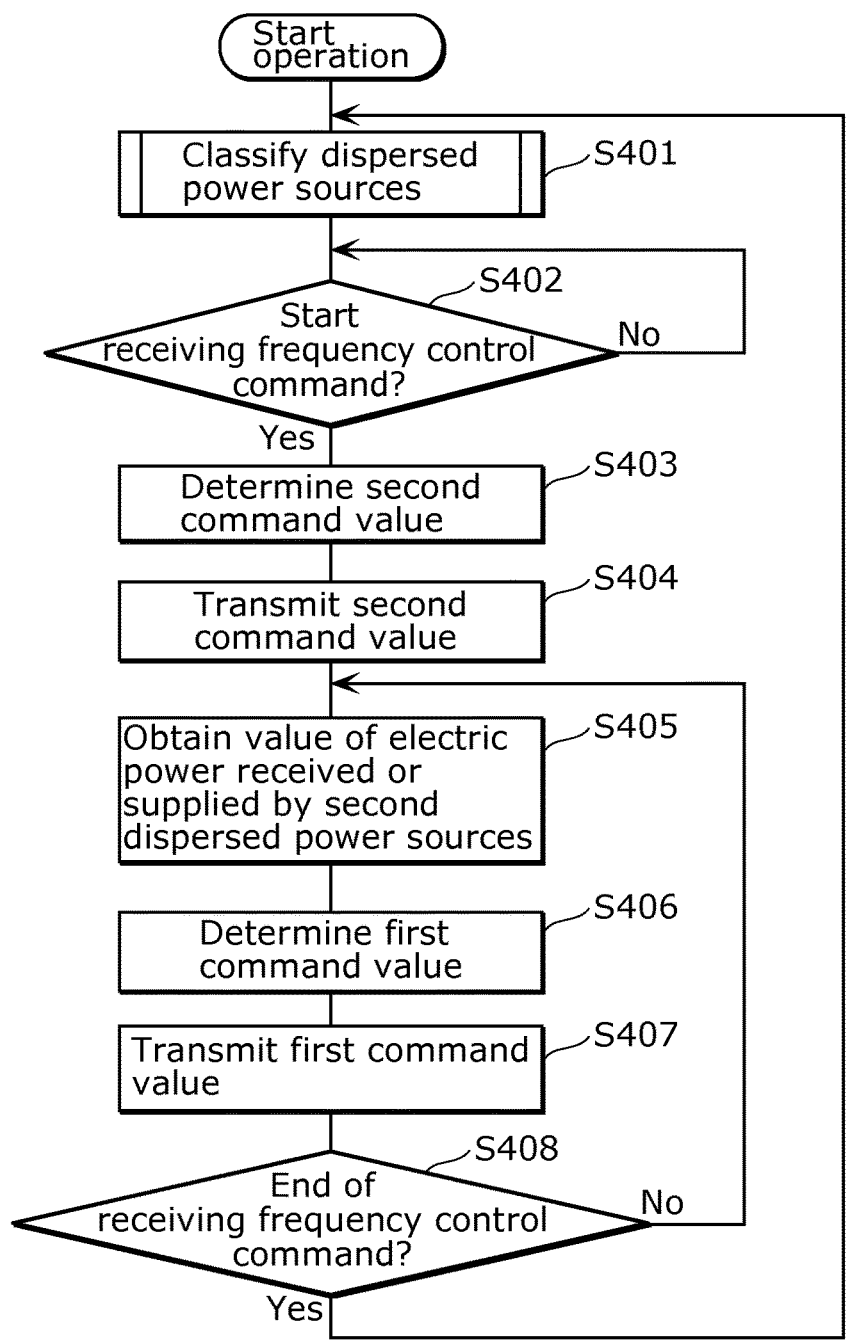
FIG. 4 is a flowchart showing an example of process flow of the frequency control apparatus according to the embodiment.
Figure 5:
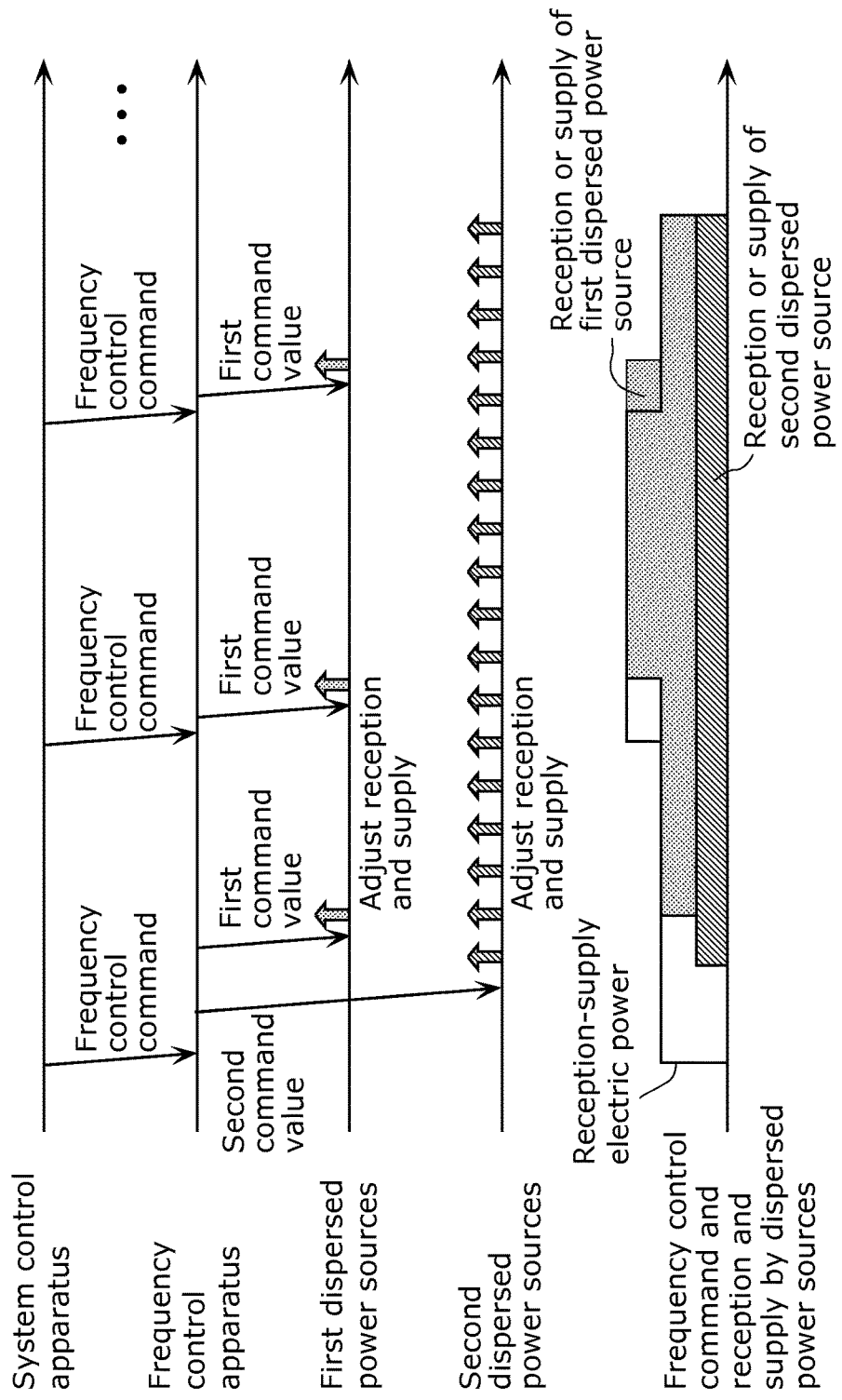
FIG. 5 is a conceptual diagram of data flow communicated in the process shown in FIG. 4.

The following describes operation of the frequency control apparatus 201 in detail with reference to FIG. 4 and FIG. 5. FIG. 4 is a flowchart showing an example of process flow of the frequency control apparatus 201. FIG. 5 is a conceptual diagram of data flow communicated in the process shown in FIG. 4.

The determination unit 203 of the frequency control apparatus 201 classifies the dispersed power sources 104a, 104b, 104c, and 104d connected to a power system as first dispersed power sources 104A or second dispersed power sources 104B (S401). In the following description, it is assumed that the dispersed power sources 104a and 104b are classified as first dispersed power sources 104A and the dispersed power sources 104c and 104d as second dispersed power sources 104B. A method of classifying the dispersed power sources is described in detail later using FIG. 6A and FIG. 6B.

Next, the command obtainment unit 202 of the frequency control apparatus 201 monitors reception of the first one of frequency control commands (S402). In the present embodiment, one cycle of frequency control processing is defined as steps from receiving of the first frequency control command (S402, Yes) to receiving of the last frequency control command (S408, Yes). The following description is based on an assumption that a plurality of frequency control commands is sequentially issued at predetermined intervals in one cycle of frequency control processing.

A method of identifying the "first frequency control command" and the "last frequency control command" is not limited to a specific method. For example, data may include flags indicating the first frequency control command and the last frequency control command. Optionally, the first frequency control command may include information specifying the number of frequency control commands to be transmitted in the current cycle of frequency control processing or a period of execution of the current cycle of frequency control processing.

When the command obtainment unit 202 receives the first frequency control command (S402, Yes) the determination unit 203 of the frequency control apparatus 201 determines only a single second command value, based on the initial frequency control command received by the command obtainment unit 202. The transmission control unit 204 of the frequency control apparatus 201 simultaneously transmits the second command value determined by the determination unit 203 via the communication unit 205 to the dispersed power sources 104c and 104d classified as the second dispersed power sources 104B (S404).

Here, the second command value is a command value to cause the second dispersed power sources 104B to set off fluctuation in electric power of a power system, and is commonly used by all the dispersed power sources classified as the second dispersed power sources 104B including the dispersed power sources 104c and 104d. The second command value according to Embodiment 1 includes information specifying an upper limit and a lower limit to frequency fluctuation with respect to a predetermined reference frequency.

For example, when a reference frequency is 50 Hz, the upper limit to frequency fluctuation is 50.1 Hz and the lower limit to the frequency fluctuation is 49.9 Hz. The upper limit and lower limit need not be at the same distance from the reference frequency. For example, the upper limit may be 50.3 Hz and the lower limit may be 49.9 Hz.

The determination unit 203 determines an upper limit and a lower limit to be included in the second command value so as to, for example, decreases the width of the frequency fluctuation (the difference between the upper limit and the lower limit) as the absolute value of the reception-supply electric power included in the frequency control command obtained as the first frequency control command increases, and increases the width of the frequency fluctuation (the difference between the upper limit and the lower limit) increases as the absolute value of the reception-supply electric power decreases.

Furthermore, the determination unit 203 may determine the second command value by determining, as the second command value in Step S403, a preliminary second command value determined tentatively in classification of the dispersed power sources 104a, 104b, 104c, and 104d in Step S401 (the preliminary second command value is described later). When the determination unit 203 determines the second command value in this manner, Step S403 may be omitted.

It is preferable that the second command value include a base reception-supply with respect to the reception-supply electric power included in a frequency control command. For example, when a frequency control command includes a reception-supply electric power of 5 kW, the total of electric power to be received or supplied by the second dispersed power sources is preferably below 5 kW. When the total of electric power to be received or supplied by the second dispersed power sources is above 5 kW, for example, 7 kW, the total of electric power to be received or supplied by the first dispersed power sources is −2 kW, which causes extra charging and discharging. In view of this, the determination unit 203 may determine a second command value to exploit the fact that absolute values of the reception-supply electric power included in general frequency control commands are approximately normally distributed. More specifically, the determination unit 203 may determine a second command value in Step S403 by comparison between an average value calculated from the normal distribution and electric power projected, based on a preliminary second command value determined in Step S401, to be received or supplied by the second dispersed power sources, that is, the dispersed power sources 104c and 104d. For example, the determination unit 203 may determine a second command value in Step S403 such that the total of electric power to be received or supplied by all the second dispersed power sources is within a range of −5 to 5% from the average value.

Upon obtaining a second command value, the dispersed power sources 104c and 104d classified as the second dispersed power sources 104B detects frequency of the power system at the frequency detecting point 103c and the frequency detecting point 103d, respectively. Next, when the frequency of the power system exceeds an upper limit, the dispersed power sources 104c and 104d receives (or are charged with) electric power having a predetermined magnitude from the power system. Next, when the frequency of the power system exceeds an upper limit, the dispersed power sources 104c and 104d supplies (or discharges) electric power having a predetermined magnitude to the power system.

As shown in FIG. 5, the second dispersed power sources 104B autonomously continue the above-described processing to set off fluctuation in electric power (frequency) of the power system using the second command value obtained in Step S404 during one cycle of frequency control processing.

Accordingly, the second command value needs to be transmitted once or more in one cycle of frequency control processing.

The second dispersed power sources 104B may start control of providing or receiving of electric power included in the obtained second command value at a control starting time indicated in information included in the obtained second command value. With this, the second command value may be delivered to the second dispersed power sources 104B a certain time before frequency control processing is started.

Furthermore, the magnitude of electric power to be received or supplied by the second dispersed power source 104B may be included in the second command value. More specifically, electric power to be received or supplied by the second dispersed power sources 104B has a value obtained by (sign)×(electric power). Here, the (sign) is a negative sign (indicating "receive") when a detected frequency is above an upper limit, and the (sign) is a positive sign (indicating "supply") when a detected frequency is below a lower limit.

Furthermore, the magnitude of electric power to be received or supplied by the second dispersed power sources 104B may have a predetermined value and the second dispersed power source 104B may already hold the predetermined value.

Alternatively, the second dispersed power sources 104B may adaptively determine the magnitude of electric power depending on the magnitude of frequency fluctuation of the power system. More specifically, the second dispersed power sources 104B may increase the absolute value of electric power as the deviation of frequency above an upper limit (or below a lower limit) increases. For example, when a frequency is above an upper limit, electric power to be received or supplied by the second dispersed power sources 104B is determined by calculating ((upper limit)−(detected frequency))×K. When a frequency is below a lower limit, electric power to be received or supplied by the second dispersed power sources 104B is determined by calculating ((lower limit)−(detected frequency))×K. Here, K is a sensitivity coefficient for determining electric power to be supplied and is measured in units of kW/Hz.

Next, the power obtainment unit 301 of the frequency control apparatus 201 obtains a total of electric power which the dispersed power sources 104c and 104d classified as the second dispersed power sources 104B receive or supply according to the second command value (S405). The power obtainment unit 301 may obtain the total by measuring actual electric power on the power line 102 or may obtain the value of electric power received or supplied by each of the dispersed power sources 104c and 104d through the communication line 105.

Alternatively, instead of the processing in Step S405, the power obtainment unit 301 may determine theoretical values of electric power electric power to be received or supplied by the second dispersed power sources 104B, based on the second command value determined by the determination unit 203. Specifically, the total of the electric power to be received or supplied by all the second dispersed power sources 104B according to a second command value is calculated as $\Sigma((\text{upper limit or lower limit})-(\text{frequency detected by the determination unit } 203))\times K_i$. Here, $K_i$ is a sensitivity coefficient for determining electric power to be received or supplied by one of the second dispersed power source 104B identified by an identifier i (i≤m). In this case, the power obtainment unit 301 need not be included as shown in FIG. 2.

Next, the determination unit 203 of the frequency control apparatus 201 determines a first command value for each of the dispersed power sources 104a and 104b classified as the first dispersed power sources 104A (S406). More specifically, the determination unit 203 divides, between a first command value for the dispersed power source 104a and a first command value for the dispersed power source 104b, electric power equivalent to the difference between the reception-supply electric power included in a frequency control command and the total of electric power obtained by the power obtainment unit 301 as electric power which the second dispersed power sources 104B receive or supply.

For example, when a reception-supply electric power included in a frequency control command is 5 kW and the total of electric power which all the second dispersed power sources 104B receive or supply is 2 kW, the total electric power to be included in the first command values is 3 kW. In this case, the electric power of 3 kW may be divided between the two first command values in any manner. For example, the first command value for the dispersed power source 104a may be set to include 2 kW and the first command value for the dispersed power source 104b may be set to include 1 kW. Alternatively, the first command value for the dispersed power source 104a may be set to include 3 kW (in this case, the first command value for the dispersed power source 104b is set to include 0 kW).

Next, the transmission control unit 204 of the frequency control apparatus 201 transmits each of the two first command values determined by the determination unit 203 to a corresponding one of the first dispersed power sources 104A through the communication unit 205 (S407). As described above, the number of the first command values determined in Step S406 is not greater than the number of the first dispersed power sources 104A. Thus, in Step S407, the number of first command values transmitted is not greater than the number of the first dispersed power sources 104A. Here, when the first command value indicating 0 kW is not to transmitted to the dispersed power source 104b for which the first command value has been set to include 0 kW, the number of the first command values to be transmitted is less than the number of the first dispersed power sources 104A.

Then, upon receiving the first command values, the dispersed power sources 104a and 104b classified as the first dispersed power sources 104A each receives or supplies electric power included in a corresponding one of the first command values to or from the power system. With this, the difference between reception-supply electric power and electric power which the second dispersed power sources 104B receive or supply is made up as shown in FIG. 5.

Next, the command obtainment unit 202 of the frequency control apparatus 201 monitors reception of the last frequency control command (S408). When the command obtainment unit 202 is yet to receive the last frequency control command (S408, No), the cycle of determination and transmission of first command values (S405 to S407) is performed again. When the command obtainment unit 202 receives the last frequency control command (S408, Yes), the current cycle of frequency control processing ends and classification of the dispersed power sources 104a to 104d (S401) is executed again in preparation for the next cycle of frequency control processing. When classification of the dispersed power sources 104a to 104d need not be performed so frequently, Step S401 may be skipped and the next cycle of frequency control processing may be also started from Step S402.

Examples of the case where the command obtainment unit 202 is yet to receive the last frequency control command (S408, No) include a case where a non-last frequency control command is received. In this case, first command values are determined and transmitted each time a frequency control command is received as shown in FIG. 5. Examples of the case where the command obtainment unit 202 is yet to receive the last frequency control command (S408, No) further include a case where a predetermined time has elapsed since receiving of the previous frequency control command (that is, no following frequency control command is received within a predetermined time after receiving of the previous frequency control command). In this case, first command values are determined and transmitted more than once for a single frequency control command. In other words, determination and transmission of first command values (S405 to S407) is executed more than once for a frequency control command.

Figure 6A:
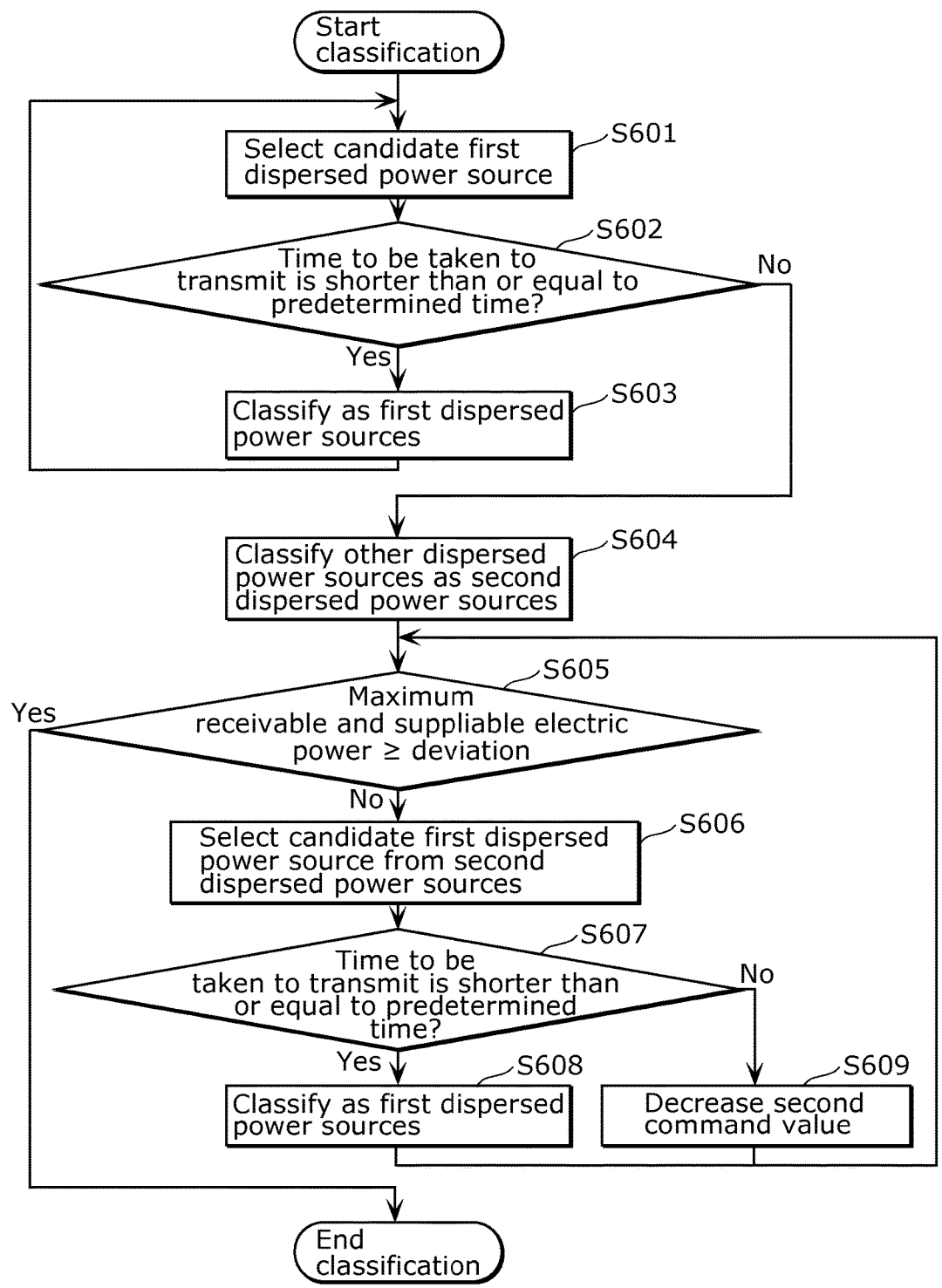
FIG. 6A is an exemplary flowchart of processing to classify apparatuses as first apparatuses or second apparatuses by the frequency control apparatus according to the embodiment.

FIG. 6A is a flowchart showing an example of a processing flow of classification of the dispersed power sources 104a to 104d as first dispersed power sources 104A or second dispersed power sources 104B by the frequency control apparatus 201.

First, the determination unit 203 selects one of the dispersed power sources 104a to 104d connected to a power system as a candidate for a first dispersed power source 104A (S601). Criteria for this selecting are not limited specifically. For example, a dispersed power source may be selected in ascending order of time which the dispersed power source takes to communicate a first command value, or in descending order of the maximum instantaneous electric power which the dispersed power source receives or supplies (or in descending order of responsivity).

Next, the determination unit 203 determines whether or not the total time to be taken to transmit first command values to the dispersed power source 104 newly selected in Step S601 and each of the other first dispersed power sources (or a first dispersed power source) 104A currently classified as first dispersed power sources 104A is shorter than or equal to a predetermined time (S602). The predetermined time is, for example, an interval between transmissions of frequency control commands. It is more preferable that the predetermined time be a time calculated as an interval between transmission of frequency control commands minus a time taken before electric power which the first dispersed power sources 104A are receiving or supplying according to the first command values become stable (response time). Alternatively, a time specified by a system control apparatus or others may be used as the predetermined time.

When the total time to be taken to the transmission is shorter than or equal to the predetermined time (S602, Yes), the determination unit 203 classifies the dispersed power source 104 which has just been selected in Step S601 into a first dispersed power source (S603), and then returns to Step S601. When the total time to be taken to the transmission is longer than the predetermined time (S602, No), the determination unit 203 does not classify the dispersed power source 104 which has just been selected in Step S601 into a first dispersed power source, and then proceeds to Step S604.

For example, assume that the total time to be taken to transmit first command values to the respective two dispersed power sources 104a and 104b is not longer than a predetermined time (S602, Yes), and that the total time to be taken to transmit first command values to the three respective dispersed power sources 104a, 104b, and 104c is longer than the predetermined time (S602, No). In this case, only the dispersed power sources 104a and 104b are classified as first dispersed power sources 104A and the dispersed power source 104c is not classified as a first dispersed power source 104A.

Next, the determination unit 203 classifies, as second dispersed power sources, the dispersed power sources 104 not classified as the first dispersed power sources 104A in Steps S601 to S603 (S604). In the above example, the dispersed power sources 104c and 104d are classified as second dispersed power sources 104B. Thus, first dispersed power sources 104A are determined so that first command values can be transmitted to all the dispersed power sources 104A within the predetermined time.

Next, the determination unit 203 compares the maximum instantaneous electric power (deviation) to be received or supplied by all the first dispersed power sources 104A as a whole and the maximum value of electric power which each of the dispersed power source 104a and the dispersed power source 104b is actually capable of receiving or supplying (S605).

Here, the "deviation" is the greatest value of total electric power to be received or supplied by all the first dispersed power sources 104A as a whole to keep frequency fluctuation of the power system within a predetermined range. For example, the deviation is equivalent to a value calculated as a maximum value (predicted value) of reception-supply electric power included in a frequency control command minus a maximum value (predicted value) of total electric power which all the second dispersed power sources 104B as a whole receive or supply.

When the maximum instantaneous electric power (deviation) to be received or supplied by all the first dispersed power sources 104A as a whole is smaller than the deviation (S605, No), the determination unit 203 selects, as a candidate to change to a first dispersed power source 104A, one of the dispersed power sources 104c and 104d classified as the second dispersed power sources 104B (S606). Criteria for this selecting are not limited specifically. For example, a dispersed power source may be selected in ascending order of time which the dispersed power source takes to communicate a first command value, or in descending order of the maximum instantaneous electric power which the dispersed power source receives or supplies (or in descending order of responsivity). In this case, assume that the dispersed power source 104d is selected.

Next, the determination unit 203 determines whether or not the total time to be taken to transmit first command values to the dispersed power sources 104a and 104b classified as the first dispersed power sources 104A in Steps S601 to S603 and the dispersed power source 104d selected in Step S606 is shorter than or equal to a predetermined time (S607).

When the total time to be taken to the transmission is shorter than or equal to the predetermined time (S607, Yes), the determination unit 203 changes the dispersed power source 104d selected in Step S606 to a first dispersed power source 104A (S608). When the total time to be taken to the transmission is longer than the predetermined time (S607, No), the determination unit 203 does not change the dispersed power source 104d to a first dispersed power source 104A, (that is, leaves the dispersed power source 104d classified as the second dispersed power source) and decreases the range of frequency fluctuation (difference between an upper limit and a lower limit) to be included in a preliminary second command value (S609). With this, frequency of the power system is more likely to depart the range of fluctuation in frequency to be indicated in the preliminary second command value. Accordingly, electric power to be received or supplied by the second dispersed power sources is increased. Alternatively, instead of changing the dispersed power source 104d to a first dispersed power source 104A, (that is, leave the dispersed power source 104d classified as the second dispersed power source) the determination unit 203 may increases the value of the electric power to be included in a preliminary second command value.

When No in Step S605, there is a possibility that the first dispersed power sources 104A as a whole is impossible to supply or receive power equivalent to the difference between the reception-supply electric power and electric power to be received or supplied by the second dispersed power sources 104B according to a preliminary second command value. To make it possible, when a remaining transmission time is available (S607, Yes), the dispersed power sources 104 classified as first dispersed power sources 104A are increased in number (S608). When such a remaining transmission time is not available (S607, No), the range of frequency fluctuation included in a preliminary second command value is decreased (S609) in order to increase the electric power to be received or supplied by the second dispersed power sources 104B (that is, in order to decrease deviation) (S609).

For the above-described purpose, the determination unit 203 repeatedly performs the processing from Steps S606 to S609 until the result of the determination in Step S605 becomes "Yes". When the maximum instantaneous electric power to be received or supplied by all the first dispersed power sources 104A as a whole exceeds the deviation (S605, Yes), the determination unit 203 ends the classification shown in FIG. 6A.

It should be noted that Steps S605 to S609 in the processing may be skipped in the classification method shown in FIG. 6A. For example, the determination in Step S602 is prioritized over the determination in Step S605, and Steps S605 and later are skipped. In other words, when using the classification method shown in FIG. 6A, it is possible at least to limit the number of dispersed power sources 104 to be classified as first dispersed power sources 104A to a number such that first command values are delivered to the first dispersed power sources 104A within a predetermined time.

Figure 6B:
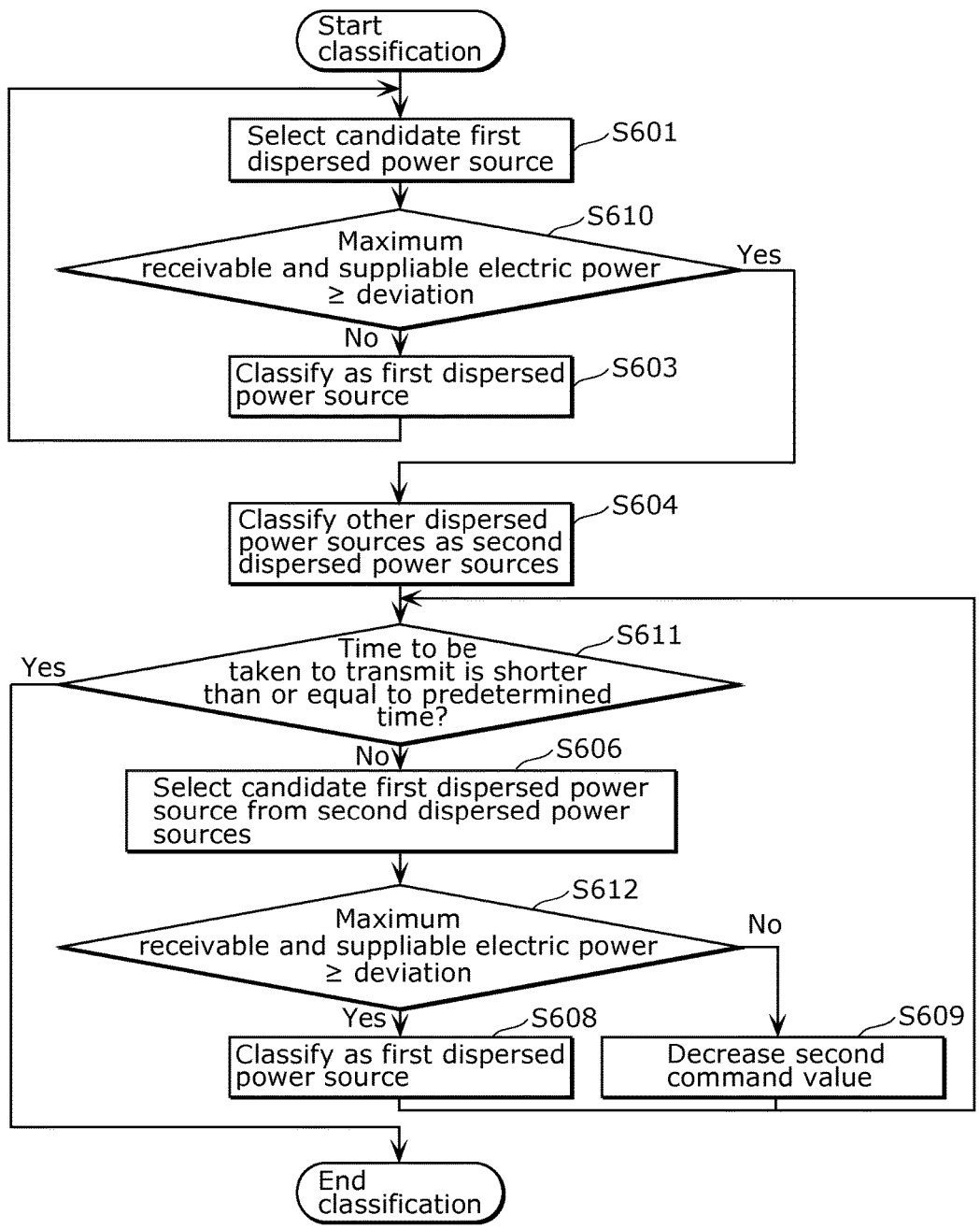
FIG. 6B is another exemplary flowchart of processing to classify apparatuses as first apparatuses or second apparatuses by the frequency control apparatus according to the embodiment.

FIG. 6B is a flowchart showing another example of a processing flow of classification of the dispersed power sources 104a to 104d as first dispersed power sources 104A or second dispersed power sources 104B by the frequency control apparatus 201. The flowchart shown in FIG. 6B is different from the flowchart shown in FIG. 6A in Steps S610, S611, and S612 instead of Steps S602, S605, and S607, respectively. Step S611 corresponds to Step S607, and Step S612 corresponds to Step S605. The other steps in the processing shown in FIG. 6B are the same as those in FIG. 6A, and therefore description thereof is omitted.

More specifically, in the classification method shown in FIG. 6B, dispersed power sources 104a to 104d are classified as first dispersed power sources 104A or second dispersed power sources 104B so that the maximum instantaneous electric power which the first dispersed power sources 104A as a whole are capable of receiving or supplying exceeds a deviation. As in the processing shown in FIG. 6A, Steps S606, S608 and S609, and S611 and S612 in FIG. 6B may be skipped.

Figure 7:
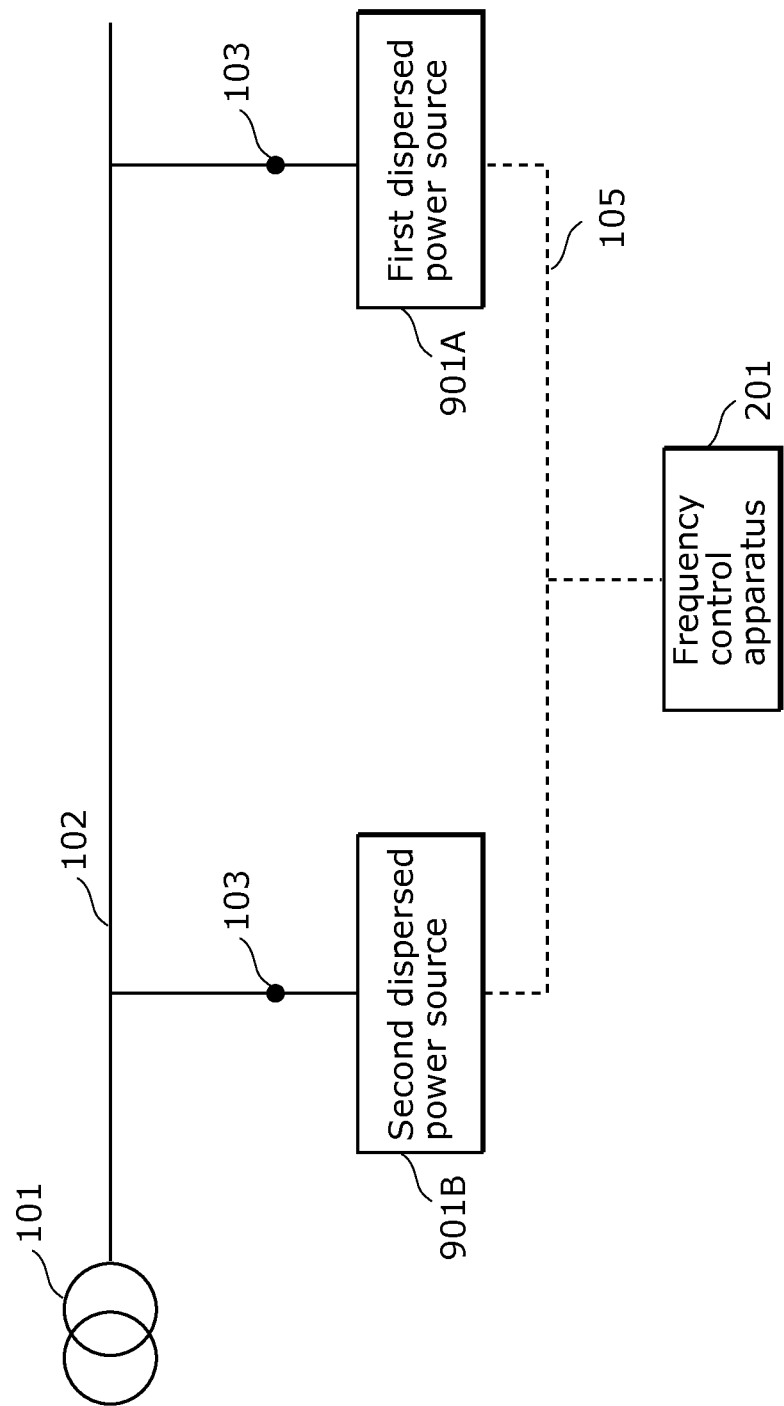
FIG. 7 is a block diagram of a power system for simulated frequency control processing by the frequency control apparatus.

FIG. 7 is a block diagram of a power system for simulated frequency control processing by the frequency control apparatus 201. The constituent elements in common with FIG. 1 are denoted with the same reference signs, and description thereof is omitted. FIG. 7 shows an exemplary case where one of two dispersed power sources is a first dispersed power source 901A and the other is a second dispersed power source 901B.

Figure 8:
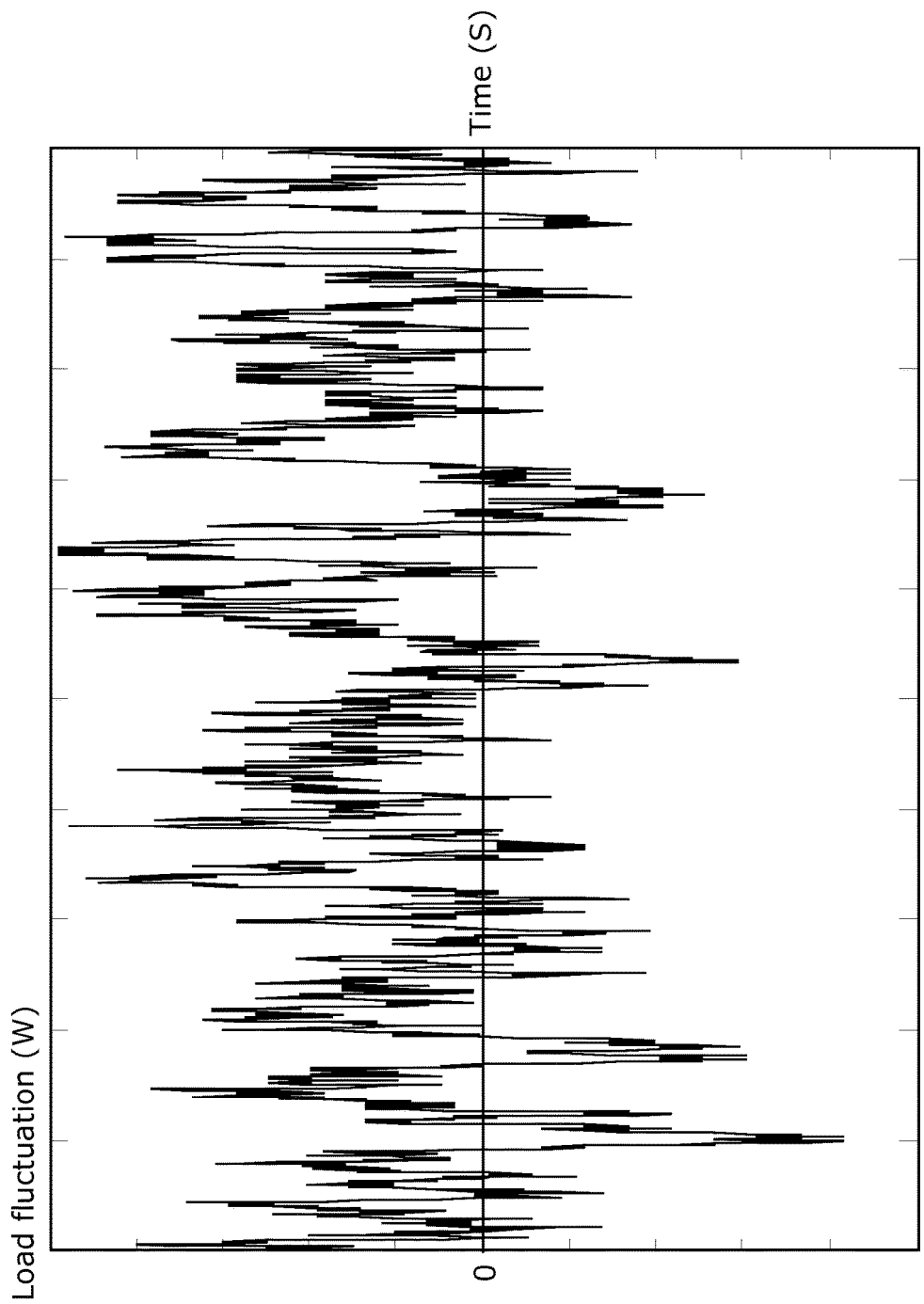
FIG. 8 shows fluctuation in load which is a precondition to simulation of frequency control processing by the frequency control apparatus.

FIG. 8 shows fluctuation in load which is a precondition to simulation of frequency control processing by the frequency control apparatus 201. In FIG. 8, the horizontal axis indicates time, and the vertical axis indicates the magnitude of fluctuation in load. The center line indicates that there is no fluctuation in load (electric power consumption=electric power supply). When load increases, the load is plotted in the area above the center line (electric power consumption>electric power supply). When load decreases, the load is plotted in the area below the center line (electric power consumption<electric power supply).

As can be seen from FIG. 8, the load on the power system rapidly fluctuates with time. Fluctuation in the frequency of the power system and the fluctuation in the load shown in FIG. 8 are opposite in phase. The system control apparatus detects the fluctuation in frequency (or in electric power) and determines reception-supply electric power to be included in frequency control commands. More specifically, when the load is positive (that is, when the load is above the center line in FIG. 8), the system control apparatus transmits a frequency control command including a reception-supply electric power having a positive value, and when the load is negative (that is, when the load is below the center line in FIG. 8), the system control apparatus transmits a frequency control command including a reception-supply electric power having a negative value.

In order to control frequency fluctuation caused by the fluctuation in load shown in FIG. 8, the frequency control apparatus 201 obtains a frequency control command from the system control apparatus, determines first command values and a second command value based on the obtained frequency control command, and transmits the determined first command values to the respective first dispersed power sources 901A and the determined second command value to the second dispersed power sources 901B.

Figure 9:
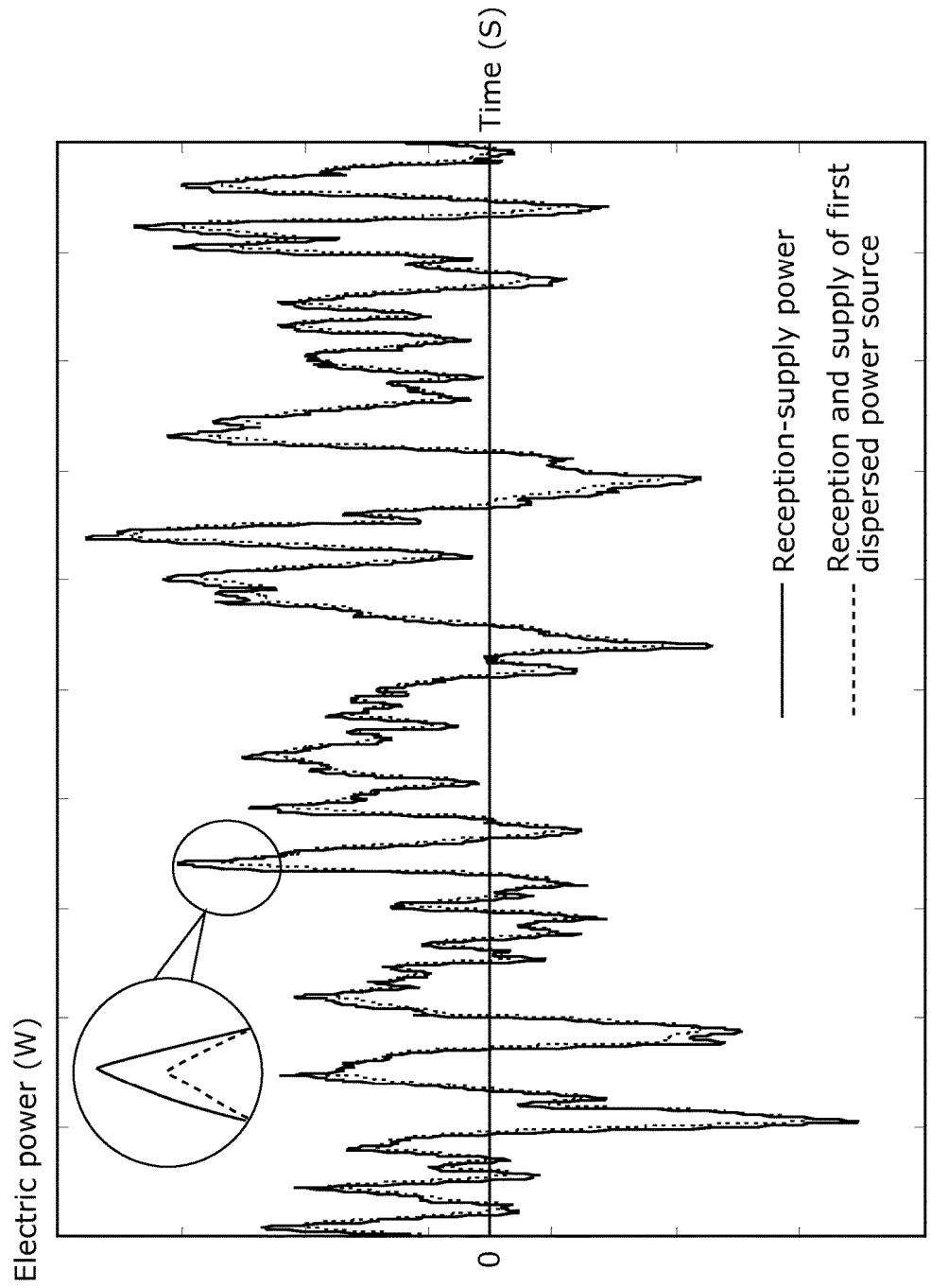
FIG. 9 shows an example of a result of simulated frequency control by the frequency control apparatus, including a solid line representing change in reception-supply electric power included in frequency control commands and a dashed line representing change in electric power received and supplied by the first dispersed power sources according to first command values.

FIG. 9 shows an example of a result of simulated frequency control by the frequency control apparatus 201. In FIG. 9, the solid line represents change in reception-supply electric power included in frequency control commands, and the dashed line represents change in electric power received and supplied by the first dispersed power sources 901A according to first command values.

In FIG. 9, the horizontal axis indicates time. The horizontal axis in FIG. 9 corresponds to the horizontal axis in FIG. 8. The vertical axis indicates values of electric power. When having a value of zero, the reception-supply electric power included in frequency control commands and the electric power received and supplied by the first dispersed power sources 901A are each plotted on the center line. When the reception-supply electric power has a positive value, it is plotted above the center line. When the first dispersed power sources 901A supply electric power, the supplied electric power is plotted above the center line. When the reception-supply electric power has a negative value, it is plotted below the center line. When the first dispersed power sources 901A receive electric power, the supplied electric power is plotted below the center line.

Referring to FIG. 9, the electric power received and supplied by the first dispersed power sources 901A (dashed line) follows the reception-supply electric power (solid line). It is to be noted that as can be seen from the enlarged schematic illustration of the waves, the electric power received and supplied by the first dispersed power sources 901A is slightly smaller in absolute value than the reception-supply electric power.

Figure 10:
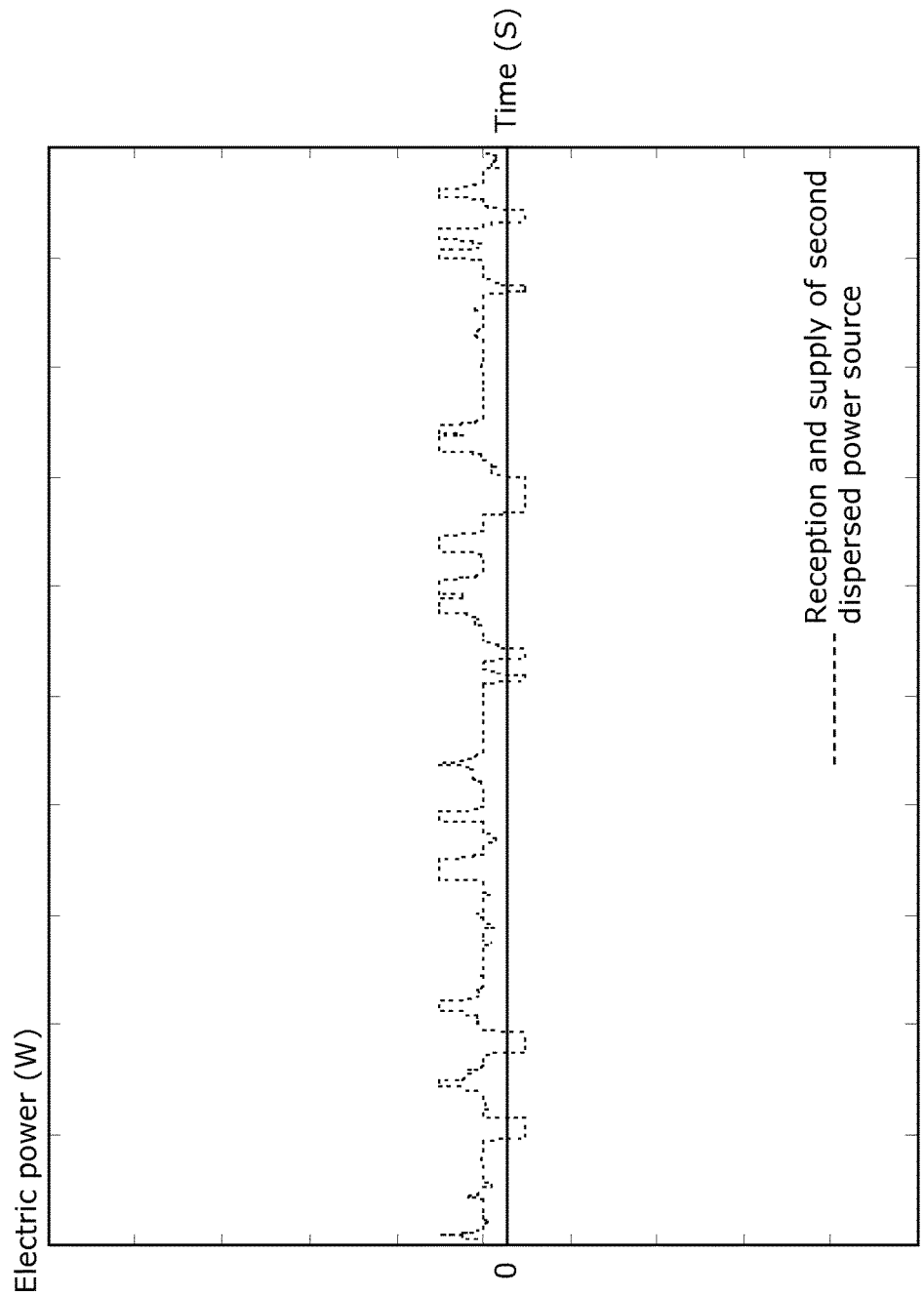
FIG. 10 shows an example of a result of simulated frequency control by the frequency control apparatus, illustrating change in electric power received and supplied by the second dispersed power sources.

FIG. 10 shows an example of a result of simulated frequency control by the frequency control apparatus 201. FIG. 10 illustrates change in electric power received and supplied by the second dispersed power sources 901B.

In FIG. 10, the horizontal axis indicates time. The horizontal axis in FIG. 10 corresponds to the horizontal axis in FIG. 8. The vertical axis indicates values of electric power. In FIG. 10, the dashed line represents change in electric power received and supplied by the second dispersed power sources 901B according to second command values. When the second dispersed power sources 901B do not supply or receive electric power, the electric power is plotted on the center line. When the second dispersed power sources 901B supply electric power, the electric power is plotted above the center line. When the second dispersed power sources 901B receive electric power, the electric power is plotted below the center line.

Figure 11:
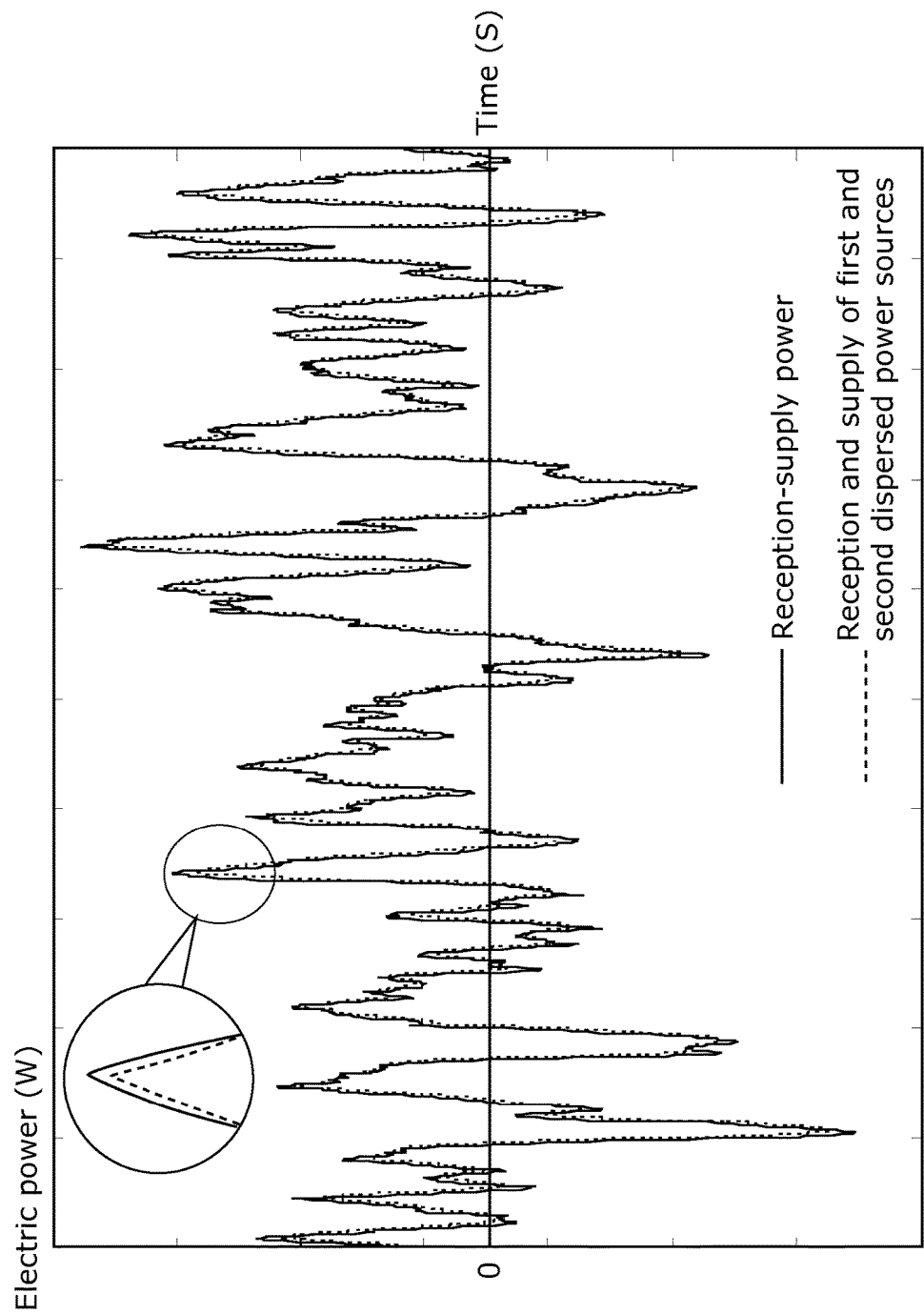
FIG. 11 shows an example of a result of simulated frequency control by the frequency control apparatus, including a solid line representing change in reception-supply electric power included in frequency control commands and a dashed line representing change in the sum of electric power received and supplied by the first dispersed power sources and electric power received and supplied by the second dispersed power sources.

FIG. 11 shows an example of a result of simulated frequency control by the frequency control apparatus 201. In FIG. 11, the solid line represents change in reception-supply electric power included in frequency control commands, and the dashed line represents change in the sum of electric power received and supplied by the first dispersed power sources 901A (dashed line in FIG. 9) and electric power received and supplied by the second dispersed power sources 901B (dashed line in FIG. 10).

In FIG. 11, the horizontal axis indicates time. The horizontal axis in FIG. 11 corresponds to the horizontal axis in FIG. 8. The vertical axis indicates values of electric power. When the reception-supply electric power is zero, it is plotted on the center line. This means that electric power to be received and supplied by the first and second dispersed power sources 901A and 901B is zero. When the reception-supply electric power is positive, the reception-supply electric power is plotted above the center line. When the first and second dispersed power sources 901A and 901B as a whole supply electric power, the supplied electric power is plotted above the center line. When the reception-supply electric power is negative, the reception-supply electric power is plotted below the center line. When the first and second dispersed power sources 901A and 901B as a whole receive electric power, the received electric power is plotted above the center line.

The portion shown in the enlarged schematic illustration of the waves in FIG. 11 corresponds to the portion shown in the enlarged schematic illustration in FIG. 9. Compared to FIG. 9, the difference in absolute value between reception-supply electric power and the sum of electric power received and supplied by the first dispersed power sources 901A and the second dispersed power sources 901B is small. This shows that the frequency control apparatus 201 is capable of causing electric power received and supplied by dispersed power sources to closely follow reception-supply electric power included in frequency control commands.

Figure 12:
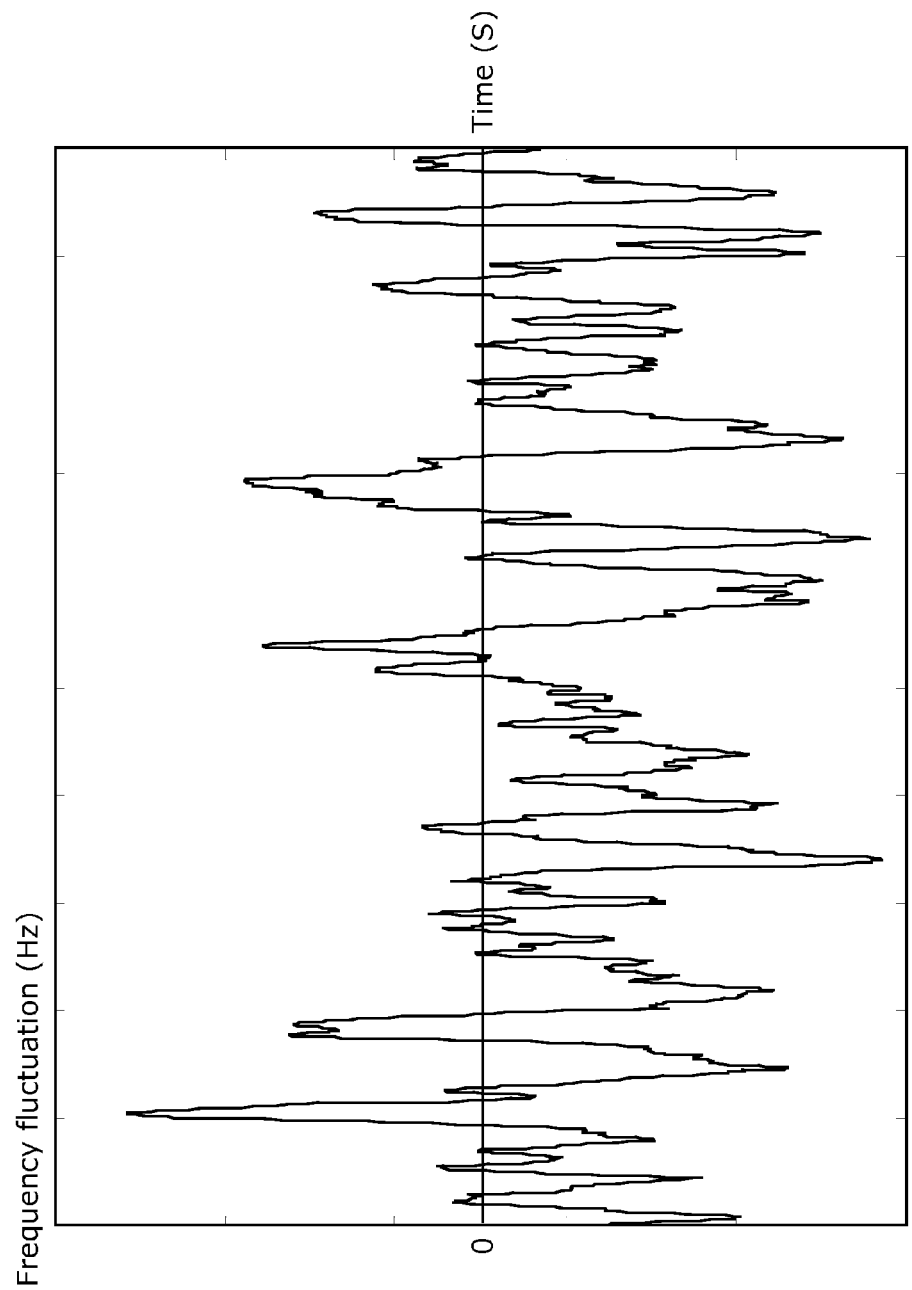
FIG. 12 shows an example of a result of simulated frequency control by the frequency control apparatus.

FIG. 12 shows an example of a result of simulated frequency control by the frequency control apparatus 201. FIG. 12 illustrates change in frequency of the power system after the above-described control. In FIG. 12, the horizontal axis indicates time. The horizontal axis in FIG. 12 corresponds to the horizontal axis in FIG. 8. The vertical axis indicates the magnitude of fluctuation in frequency. The upper limit of the vertical axis in FIG. 12 indicates the upper limit of frequency of the power system. The lower limit of the vertical axis in FIG. 12 indicates the lower limit of frequency of the power system. The solid line in FIG. 12 represents fluctuations of the frequency.

As can be seen from FIG. 12, the frequency fluctuates between the upper limit and the lower limit, that is, the frequency control apparatus 201 is capable of controlling electric power which is received and supplied by the dispersed power sources so as to keep frequency of the power system within a predetermined range.

The above description of the present embodiment has focused on secondary batteries, which is an exemplary apparatus. The above-described dispersed power sources 104 use 0 kW (this indicates that there is no reception or supply of electric power) as a reference electric power, and adjust reception and supply of electric power to and from the power system by being charged with (receiving) electric power and discharging (supplying) electric power according to first commands values and second command values to.

The present invention is not limited to this. For example, among the dispersed power sources 104a to 104d the determination unit 203 may classify, as the first dispersed power sources 104A, secondary batteries which are caused to perform only one of charging and discharging, and classify, as the second dispersed power sources 104B, secondary batteries which are caused to perform only the other of charging and discharging.

Then, the secondary batteries which are caused to perform only charging may adjust electric power to be received from or supplied to the power system by being charged with electric power larger than a reference charging electric power (receiving) or being charged with electric power smaller than a reference charging electric power (supplying). Similarly, the secondary batteries which are allowed to perform discharging may adjust electric power to be received from or supplied to the power system by discharging electric power smaller than a reference charging electric power (receiving) or discharging electric power larger than a reference charging electric power (supplying).

When the secondary batteries are classified in this manner, each of the secondary batteries need not perform both charging and discharging in a single cycle of frequency control processing. This effectively slows deterioration of the secondary batteries. The method of determining secondary battery to be for charging only or for discharging only is not specifically limited. In an exemplary method, it may be determined by comparing present battery levels of the secondary batteries, so that the secondary battery at a lower level is determined to be a battery for charging only and the secondary battery at a higher level to be a battery for discharging only.

Furthermore, the frequency control apparatus 201 may perform the control on loads instead of the dispersed power sources 104 in FIG. 1, such as a heater or an electric water heater. The frequency control apparatus 201 transmits each first command value to a corresponding one of the first loads, and transmits a second command value simultaneously to the second loads to cause the first loads and the second loads to adjust power consumption according to the first command values and the second command value.

It should be noted that these loads are not capable of supplying electric power. Thus, the frequency control apparatus 201 may perform control by for example, using an average power consumption as a reference value to determine first command values and a second command value with respect to the reference value so that the loads can follow the command values. More specifically, the loads adjust electric power to be received from and supplied to a power system by consuming electric power larger than the average power consumption (receiving) and consuming electric power smaller than the average power consumption (supplying).

Alternatively, electricity generation apparatuses such as fuel cells may be used for frequency control of a power system instead of the dispersed power sources 104 shown in FIG. 1. More specifically, the electricity generation apparatuses adjust electric power to be received from and supplied to a power system by generating electric power smaller than a reference generating electric power (receiving) and generating electric power larger than the reference generating electric power (supplying). The reference generating electric power is, for example, an average generating electric power.

Furthermore, the determination unit 203 may classify the above-described various apparatuses according to characteristics thereof. For example, the determination unit 203 may classify, as first apparatuses, apparatuses capable of only one of consumption of electric power and supply (generation) of electric power (that is, loads or electricity generation apparatuses), and classify, as second apparatuses, apparatuses capable of both of consumption (charging) of electric power and supply (discharging) of electric power (that is, secondary batteries).

The frequency control apparatus 201 sets off fluctuation in electric power of the power system by causing the secondary batteries (the second apparatuses) to perform charging and discharging according to the second command values. Optionally, the frequency control apparatus 201 may transmit first command values such that the electricity generation apparatuses generate (supply) electric power when reception-supply electric power minus electric power which the second apparatuses supply or receive is positive, and such that the electricity generation apparatuses consume (receive) electric power when reception-supply electric power minus electric power which the second apparatuses supply or receive is negative.

In the above-described embodiment, an exemplary case has been described in which first command values are electric power command values and the second command values are frequency command values (Case 1 in FIG. 13). The present invention is not limited to the case. Any of cases 1 to 4 shown in FIG. 13 is applicable to the present invention.

It should be noted that in the case where the first command values are frequency command values (Cases 3 and 4), the first command value each indicate information which specifies an upper limit and a lower limit to fluctuation in frequency with respect to a predetermined reference frequency as with the above-described second command values. Upon receiving the first command values, the first apparatuses detect frequency of the power system. When the frequency of the power system is above the upper limit, the first apparatuses receive electric power having a predetermined magnitude (electric power). When the frequency of the power system is below the lower limit, the first apparatuses supply electric power having a predetermined magnitude (electric power). Case 4 is different from the case where only second command values are frequency command values in that, unlike the second command values having the same values determined commonly for the second apparatuses, the first command values are determined for the respective first apparatuses.

In the case where the second command values are electric power command values (Cases 2 and 3), the second command values indicate information which specifies electric power to be received or supplied by the second apparatuses when frequency of the power system deviates from the range of reference frequency. Upon receiving the second command values, the second apparatuses detect frequency of the power system. When the frequency of the power system is above the upper limit, the second apparatuses receive electric power from the power system. When the frequency of the power system is below the lower limit, the second apparatuses supplies electric power to the power system.

In the above-described embodiment, the determination unit 203 determines the second command values, and the communication unit 205 transmits the determined second command values simultaneously to m dispersed power sources 104 classified as the second dispersed power sources 104B. The present invention is not limited to the case. To put it another way, the frequency control apparatus in the present disclosure is not limited to a frequency control apparatus in which the determination unit 203 determines second command values or the communication unit 205 transmits the second command values simultaneously to the second dispersed power sources 104B. The dashed lines with arrowheads in FIG. 2 and FIG. 3 indicate that the communication unit 205 may not transmit the second command values to the second dispersed power sources 104B.

For example, the dispersed power sources 104 may store a predetermined second command value which is a fixed value. More specifically, in this case, the dispersed power sources 104 are pre-loaded with a second command value, and the dispersed power sources 104 classified as the second dispersed power sources 104B supply or receive electric power according to the second command value to set off fluctuation in electric power (or frequency) of the power system. When a second command value is preloaded in the dispersed power sources 104 in this manner, it is preferable that the second command value be preloaded in all the dispersed power sources 104. However, the second command value need not be preloaded in all the dispersed power sources 104. For example, when a second command value is preloaded in part of the dispersed power sources 104, only the part of the dispersed power sources 104 are classified as second dispersed power sources 104B. Alternatively, a second command value may be transmitted only to dispersed power sources 104 not preloaded with the second command value among the dispersed power sources 104 classified as second dispersed power sources 104B.

Alternatively, for example, the dispersed power sources 104 may determine a second command value using a predetermined algorithm. The second command value is determined the same method as the above-described method of determining second command values by the determination unit 203.

Using the method, the determination unit 203 determines the first command values based on frequency control command and electric power to be received or supplied by the second dispersed power sources 104B according to the second command value. The "electric power to be received or supplied by the second dispersed power sources 104B according to the second command value" may be either a total of electric power received or supplied by the second dispersed power sources 104B obtained by the power obtainment unit 301 or a theoretical value of electric power to be received or supplied by the second dispersed power sources 104B determined based on the second command value. In the latter case, the second command value may be a predetermined fixed value held by the frequency control apparatus 201 or may be determined using a predetermined algorithm.

(Modifications of the Embodiment)

Although the present invention is described based on the above embodiment, it should be understood that the present invention is not limited to the embodiment. The following is also within the scope of the present invention.

(1) Specifically, each of the above-described apparatuses may be a computer system including a microprocessor, a ROM, a RAM, a hard disk unit, a display unit, a keyboard, a mouse, and the so on. The RAM or the hard disk unit stores a computer program. Each of the apparatuses performs its functions through operation of the microprocessor according to the computer program. Here, the computer program includes a combination of instruction codes to indicate instructions to the computer so that the computer performs predetermined functions.

(2) All or part of the components of each of the above-described apparatuses may be composed of a single system large scale integration (LSI). The system LSI is a super-multifunctional LSI manufactured by integrating constituent units on one chip, and is specifically a computer system including a microprocessor, ROM, and RAM. The ROM stores a computer program. Each of the functions is achieved through operation of the microprocessor according to the computer program loaded from the ROM to the RAM.

(3) All or part of the components of the apparatuses may be an integrated circuit (IC) card or a unit of a module attachable to the apparatus. Each of the IC card and the module is a computer system including components such as a microprocessor, a ROM, and a RAM. The IC card and the module may include the above-described super-multifunctional LSI. The microprocessor operates according to the computer program, so that the IC card or the module performs its functions. The IC card and the module may be tamper-resistant.

(4) The present invention may be implemented as a method in which the processes described above are performed. Furthermore, the present invention may be implemented as a computer program which performs the method on a computer or a digital signal indicating the computer program.

The present invention may also be the computer program or the digital signal recorded on a computer-readable recording medium, such as a flexible disk, a hard disc, a CD-ROM, an MO, a DVD, a DVD-ROM, a DVD-RAM, Blu-ray Disc (BD), a semiconductor memory, or the like (Blu-ray is a registered trademark). The present invention may also be implemented as the digital signal recorded on any of the recording media.

The present invention may also be implemented as the computer program or the digital signal transmitted via an electric telecommunication line, wire or wireless communication line, a network typified by the Internet, data broadcasting, or the like.

Furthermore, the present invention may be implemented as a computer system including a microprocessor and memory. The memory stores the above-mentioned computer program so that the microprocessor can operate according to the computer program.

The program or the digital signal may be recorded on a recording medium for transportation or transmitted through a network or the like so that the program is executed on another independent computer system.

(5) The embodiment and modifications may be implemented in combination.

Although the embodiment of the present invention is described with reference to the drawings, the present invention is not limited to the embodiment shown in the drawings. Various modifications and variations of the embodiment shown in the drawings are covered by the present invention as long as they are the same as or equivalent to the present invention.

INDUSTRIAL APPLICABILITY

The present invention is applicable to frequency control apparatuses among others for determining a command value to control frequency of a power system in which dispersed power systems are interconnected.

REFERENCE SIGNS LIST

101 Substation
102 Power line
103, 103a, 103b, 103c, 103d Frequency detecting point
104, 104a, 104b, 104c, 104d Dispersed power source
104A, 901A First dispersed power source
104B, 901B Second dispersed power source
105 Communication line
201 Frequency control apparatus
202 Command obtainment unit
203 Determination unit
204 Transmission control unit
205 Communication unit
301 Power obtainment unit

The invention claimed is:

1. A method of controlling frequency of a power system by a frequency control system including: plural apparatuses connected to the power system; and a frequency control apparatus which controls, via a communication network, electric power to be received and supplied by the plural apparatuses, and the method comprising:
communicating with first apparatuses and second apparatuses, the first apparatuses being included in the plural apparatuses and n in number, the second apparatuses being included in the plural apparatuses, m in number, and different from the first apparatuses, n and m each being a natural number not less than 1;
obtaining a frequency control command to keep frequency fluctuation of the power system within a predetermined range;
obtaining information on electric power to be received or supplied by the m second apparatuses;
determining first command values for controlling electric power to be received or supplied by the n first apparatuses, based on the frequency control command obtained in the obtaining of a frequency control command and the obtained information on electric power to be received or supplied by the m second apparatuses; and
transmitting each of the n first command values determined in the determining to a corresponding one of the first apparatuses.

2. The method of controlling frequency according to claim 1,
wherein in the determining, one second command value for controlling electric power to be received or supplied by the m second apparatuses is further determined based on the frequency control command obtained in the obtaining of a frequency control command, and
in the transmitting, the second command value determined in the determining is further transmitted to the m second apparatuses simultaneously.

3. The method of controlling frequency according to claim 2,
wherein the frequency control command includes a value of reception-supply electric power to be received from or supplied to the power system,
each of the n first command values includes a value of electric power to be received or supplied by the corresponding one of the n first apparatuses, and
in the determining, electric power equivalent to a difference between the reception-supply electric power included in the frequency control command and the electric power to be received or supplied by the m second apparatuses according to the second command value is divided among the n first command values.

4. The frequency control method according to claim 3,
wherein the second command value includes an upper limit and a lower limit to the frequency fluctuation with respect to a predetermined reference frequency, the second command value being a value of a command which causes the m second apparatuses to receive electric power from the power system when the frequency of the power system is above the upper limit, and which causes the m second apparatuses to supply electric power to the power system when the frequency of the power system is below the lower limit, and
in the determining, a difference between the upper limit and the lower limit is decreased as an absolute value of the reception-supply electric power included in the frequency control command increases.

5. The method of controlling frequency according to claim 3,
wherein the second command value includes a value of electric power to be received or supplied when the frequency of the power system deviates from a predetermined reference frequency, the second command value being a value of a command which causes the m second apparatuses to receive electric power from the power system when the frequency of the power system is above the reference frequency, and which causes the m second apparatuses to supply electric power to the power system when the frequency of the power system is below the reference frequency, and
in the determining, the electric power is increased in value as an absolute value of the reception-supply electric power to be received from or supplied to the power system included in the frequency control command increases.

6. The method of controlling frequency according to claim 2,
wherein the frequency control command includes a value of reception-supply electric power to be received from or supplied to the power system,
each of the n first command values includes an upper limit and a lower limit to the frequency fluctuation with respect to a predetermined reference frequency, the first command value being a value of a command which causes the corresponding one of the first apparatuses to receive electric power from the power system when the frequency of the power system is above the upper limit, and which causes the corresponding one of the first apparatuses to supply electric power to the power system when the frequency of the power system is below the lower limit, and
in the determining, a difference between the upper limit and the lower limit included in each of the n first command values is decreased as an absolute value of electric power equivalent to a difference between the reception-supply electric power included in the frequency control command and the electric power to be received or supplied by the m second apparatuses according to the second command value increases.

7. The method of controlling frequency according to claim 2,
wherein the frequency control command includes a value of reception-supply electric power to be received from or supplied to the power system, and
in the determining, the plural apparatuses are classified as the n first apparatuses or the m second apparatuses so that a maximum electric power which the n first apparatuses as a whole are capable of receiving or supplying exceeds electric power equivalent to a difference between the reception-supply electric power included in the frequency control command and the electric power to be received or supplied by the m second apparatuses according to the second command value.

8. The method of controlling frequency according to claim 2,
wherein in the obtaining of a frequency control command, a plurality of the frequency control commands are obtained at predetermined intervals, and
in the determining, the second command value is determined based on at least one of the frequency control commands which is obtained first in the obtaining of a frequency control command.

9. The method of controlling frequency according to claim 1,
wherein in the determining, among the plural apparatuses,
n apparatuses each capable of transmitting the first command value within a predetermined time are classified as the first apparatuses, and
m apparatuses not classified as the first apparatuses are classified as the second apparatuses.

10. The method of controlling frequency according to claim 1,
wherein the plural apparatuses include plural secondary batteries, and
among the plural secondary batteries,
secondary batteries which are caused to perform only one of charging and discharging are classified as the first apparatuses, and
secondary batteries which are caused to perform only the other of charging and discharging are classified as the second apparatuses.

11. The method of controlling frequency according to claim 1,
wherein among the plural apparatuses,
apparatuses which are capable of performing only one of consumption of electric power and supply of electric power are classified as the first apparatuses, and
apparatuses which are capable of performing both of consumption of electric power and supply of electric power are classified as the second apparatuses.

12. The method of controlling frequency according to claim 1,
wherein in the obtaining of a frequency control command, a plurality of the frequency control commands are obtained at predetermined intervals, and
in the determining, each time the frequency control command is obtained in the obtaining of a frequency control command, the n first command values are determined for the respective n first apparatuses according to the frequency control command.

13. The method of controlling frequency according to claim 1,
wherein in the obtaining of a frequency control command, the frequency control command is generated and obtained.

14. The method of controlling frequency according to claim 1,
wherein the plural apparatuses are plural dispersed power sources including: first dispersed power sources which are the first apparatuses; and second dispersed power sources which are the second apparatuses, and
the frequency control apparatus controls the electric power to be received from and supplied to the power system by the plural dispersed power sources.

15. The method of controlling frequency according to claim 1,
wherein the plural apparatuses are plural loads including: first loads which are the first apparatuses; and second loads which are the second apparatuses, and
the frequency control apparatus controls the electric power to be received from and supplied to the power system by the plural loads.

16. A frequency control system comprising:
plural apparatuses connected to a power system and including first apparatuses which are n in number and m second apparatuses which are different from the first apparatuses and m in number, n and m each being a natural number not less than 1; and
a frequency control apparatus which controls, via a communication network, electric power to be received and supplied by the plural apparatuses,
wherein the frequency control apparatus includes:
a command obtainment unit configured to obtain a frequency control command to keep frequency fluctuation of the power system within a predetermined range;
a determination unit configured to (i) obtain information on electric power to be received or supplied by the m second apparatuses, and (ii) determine n first command values for controlling electric power to be received or supplied by the n first apparatuses, based on the frequency control command obtained by the command obtainment unit and the obtained information on electric power to be received or supplied by the m second apparatuses; and
a transmission control unit configured to transmit each of the n first command values determined by the determination unit to a corresponding one of the first apparatuses, and
each of the first apparatuses receives from or supplies to the power system electric power according to the corresponding one of the first command values received from the frequency control apparatus.

17. A dispersed power source for use in the frequency control system according to claim 16.

18. A dispersed power source in a frequency control system which controls frequency of a power system, the dispersed power source comprising
plural apparatuses which are controlled by a server and include first apparatuses which are n in number and second apparatuses which are different from the first apparatuses and m in number, n and m each being a natural number not less than 1,
wherein the dispersed power source receives, from the server, electric power command values determined by the server as n first command values for controlling electric power to be received or supplied by the respective first apparatuses which are n in number, based on electric power to be received or supplied by the m second apparatuses and a frequency control command to keep frequency fluctuation of the power system within a predetermined range, and receives from or supplies to the power system, electric power corresponding to the electric power command values received from the server.

19. A frequency control apparatus included in a frequency control system which controls frequency of a power system and in which the frequency control apparatus controls, via a communication network, electric power to be received and supplied by plural apparatuses including first apparatuses which are n in number and second apparatuses which are different from the first apparatuses and m in number, n and m each being a natural number not less than 1, the frequency control apparatus comprising:
- a command obtainment unit configured to obtain a frequency control command to keep frequency fluctuation of the power system within a predetermined range;
- a determination unit configured to (i) obtain information on electric power to be received or supplied by the m second apparatuses, and (ii) determine n first command values for controlling electric power to be received or supplied by the n first apparatuses, based on the frequency control command obtained by the command obtainment unit and the obtained information on electric power to be received or supplied by the m second apparatuses; and
- a transmission control unit configured to transmit each of the n first command values determined by the determination unit to a corresponding one of the first apparatuses.

20. A non-transitory computer-readable recording medium for use in a computer, the recording medium having a program recorded thereon for causing a computer to cause plural apparatuses to receive and supply electric power, the plural apparatuses being connected to a power system and including first apparatuses which are n in number and second apparatuses which are different from the first apparatuses and m in number, n and m each being a natural number not less than 1, the program causing the computer to execute:
- obtaining a frequency control command to keep frequency fluctuation of the power system within a predetermined range;
- (i) obtaining information on electric power to be received or supplied by the m second apparatuses, and (ii) determining n first command values for controlling electric power to be received or supplied by the n first apparatuses, based on the frequency control command obtained in the obtaining of a frequency control command and the obtained information on electric power to be received or supplied by the m second apparatuses; and
- transmitting each of the n first command values determined in the determining to a corresponding one of the first apparatuses.

* * * * *